US012563412B2

(12) United States Patent (10) Patent No.: US 12,563,412 B2
Taskin et al. (45) Date of Patent: Feb. 24, 2026

(54) EASYMESH CONFIGURATION OF AP USING IEEE 1905.1

(71) Applicant: AIRTIES S.A.S., Paris (FR)

(72) Inventors: Metin Ismail Taskin, Istanbul (TR); Koen Van Oost, Istanbul (TR)

(73) Assignee: AIRTIES S.A.S., Paris (FR)

( * ) Notice: Subject to any disclaimer, the term of this patent is extended or adjusted under 35 U.S.C. 154(b) by 432 days.

(21) Appl. No.: 17/799,146

(22) PCT Filed: Feb. 11, 2021

(86) PCT No.: PCT/IB2021/051148
§ 371 (c)(1),
(2) Date: Aug. 11, 2022

(87) PCT Pub. No.: WO2021/161225
PCT Pub. Date: Aug. 19, 2021

(65) Prior Publication Data
US 2023/0080739 A1 Mar. 16, 2023

Related U.S. Application Data

(60) Provisional application No. 62/975,022, filed on Feb. 11, 2020.

(51) Int. Cl.
| | |
|---|---|
| *H04W 24/02* | (2009.01) |
| *H04L 43/08* | (2022.01) |
| *H04W 24/10* | (2009.01) |
| *H04W 84/12* | (2009.01) |

(52) U.S. Cl.
CPC ............. *H04W 24/02* (2013.01); *H04L 43/08* (2013.01); *H04W 24/10* (2013.01); *H04W 84/12* (2013.01)

(58) Field of Classification Search
CPC ...... H04L 41/046; H04L 43/08; H04W 24/02; H04W 24/10; H04W 84/12
See application file for complete search history.

(56) References Cited

U.S. PATENT DOCUMENTS

| | | | | |
|---|---|---|---|---|
| 10,542,486 B1 | 1/2020 | Strater et al. | | |
| 2020/0404540 A1* | 12/2020 | Kerpez | ............. | H04W 28/0268 |
| 2021/0075697 A1* | 3/2021 | Dattagupta | ......... | H04L 41/5019 |

(Continued)

OTHER PUBLICATIONS

IEEE Standard for a Convergent Digital Home Network for Heterogeneous Technologies, IEEE Std. 1905.1-2013 (Apr. 12, 2013).

(Continued)

*Primary Examiner* — Donald L Mills
(74) *Attorney, Agent, or Firm* — VOLPE KOENIG

(57) ABSTRACT

A wireless network device and method that operate an enhanced mesh network management (EMNM) agent at the wireless network device. The EMNM agent receives, from at least one associated mesh access point (AP), a WiFi EasyMesh compatible message. The EMNM agent determines whether the WiFi EasyMesh compatible message includes an additional information element including device metrics of the at least one associated mesh AP. On a condition that the EMNM agent determines that the WiFi EasyMesh compatible message includes the additional information element, the wireless network device stores the device metrics of the at least one associated mesh AP.

20 Claims, 7 Drawing Sheets

(56)                    References Cited

U.S. PATENT DOCUMENTS

| | | | | |
|---|---|---|---|---|
| 2021/0211959 | A1* | 7/2021 | Nakagawa | H04W 36/10 |
| 2021/0235321 | A1* | 7/2021 | Tachibana | H04W 74/0816 |
| 2022/0322339 | A1* | 10/2022 | Park | H04W 72/0453 |
| 2023/0363058 | A1* | 11/2023 | Nakajima | H04W 88/12 |
| 2024/0389139 | A1* | 11/2024 | Cherian | H04L 1/0057 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, Amendment 8: IEEE 802.11 Wireless Network Management, IEEE Std. 802.11v-2011 (Feb. 9, 2011).

LAN/MAN Standards Committee of the IEEE Computer Society, "IEEE Standard for Information technology—Telecommunications and information exchange between systems—Local and metropolitan area networks—Specific requirements. Part 11: Wireless LAN Medium Access Control (MAC) and Physical Layer (PHY) Specifications. Amendment 1: Radio Resource Measurement of Wireless LANs," IEEE Std. 802.11k-2008 (Jun. 12, 2008).

Wi-Fi Alliance, Multi-AP Specification Version 2.0 (Dec. 2019).

* cited by examiner

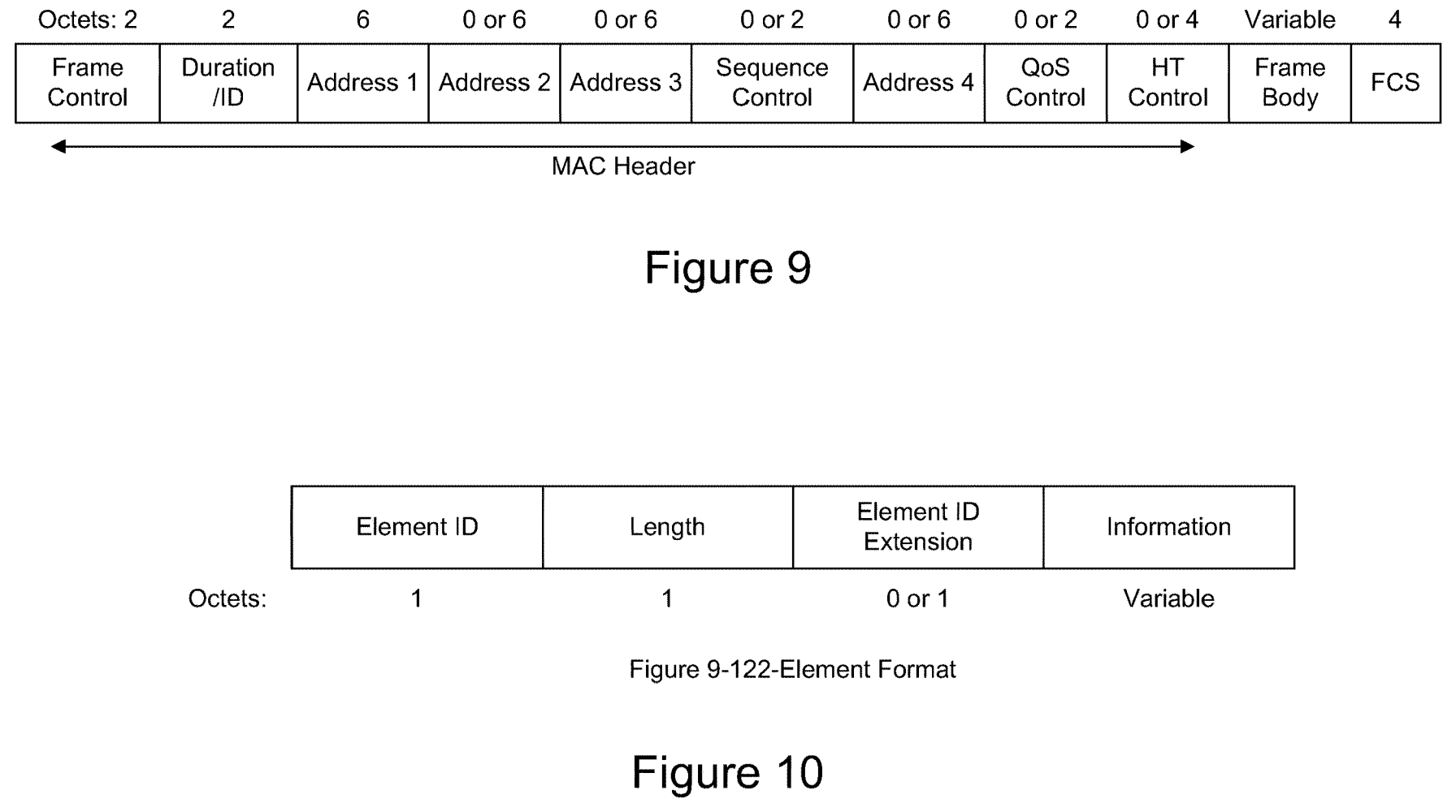

| Octets: 2 | 2 | 6 | 0 or 6 | 0 or 6 | 0 or 2 | 0 or 6 | 0 or 2 | 0 or 4 | Variable | 4 |
|---|---|---|---|---|---|---|---|---|---|---|
| Frame Control | Duration /ID | Address 1 | Address 2 | Address 3 | Sequence Control | Address 4 | QoS Control | HT Control | Frame Body | FCS |

MAC Header

Figure 9

| Element ID | Length | Element ID Extension | Information |
|---|---|---|---|
| 1 | 1 | 0 or 1 | Variable |

Octets:

Figure 9-122-Element Format

Figure 10

EASYMESH CONFIGURATION OF AP USING IEEE 1905.1

CROSS REFERENCE TO RELATED APPLICATION

This application claims the benefit of U.S. Provisional Application No. 62/975,022, filed Feb. 11, 2020, the contents of which are incorporated herein by reference.

SUMMARY

A wireless network device and method that operate an enhanced mesh network management (EMNM) agent at the wireless network device. The EMNM agent receives, from at least one associated mesh access point (AP), a WiFi EasyMesh compatible message. The EMNM agent determines whether the WiFi EasyMesh compatible message includes an additional information element including device metrics of the at least one associated mesh AP. On a condition that the EMNM agent determines that the WiFi EasyMesh compatible message includes the additional information element, the wireless network device stores the device metrics of the at least one associated mesh AP.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 9 is an illustration of an IEEE 802.11-2016 MAC frame; and

FIG. 10 is an illustration of an IEEE 802.11-2016 information element format.

DETAILED DESCRIPTION

Standards setting organizations generate and recommend qualifications and standards for providing compatibility and interoperability among different manufacturers (vendors). Products undergo detailed certification tests to prove compliance with the standard. Yet, some standards may restrain vendors from leveraging advanced features, as the standards and the certification tests may lag behind the latest innovations in the respective field.

An example of such a standard (and the certification program) is the WiFi Alliance's CERTIFIED EasyMesh™, referred to in this document as WiFi EasyMesh™ or simply EasyMesh™, program which has set a milestone for multi-AP management and for deploying applications that span more than a single network node in a residential network. Yet, there is clearly a need to define new, future items or items that are not adopted by the WiFi Alliance (WFA) in a dedicated variant/extension version of WiFi EasyMesh™.

This disclosure presents systems and methods for extending capabilities of a mesh network management standard. Throughout the application, these enhancements will be addressed as or referred to as an Enhanced Mesh Network Management system, or EMNM in short.

In one embodiment, dedicated extensions to the WiFi EasyMesh™ program through a series of EMNM-specific IEEE 1905.1 messages and Type-Length-Values (further denoted as TLVs in this application) are described. EMNM, by example, can be understood by people skilled in the art of WiFi as a vendor-specific extension to an existing standard to enrich the features offered by the standard.

Furthermore, throughout this application, a mesh network Controller may be called an "EMNM Controller" if it supports the features and the TLVs that are used by EMNM. Likewise, a device Agent may be called an "EMNM Agent" if it supports the features and the TLVs that are used by EMNM. Additionally, a WiFi EasyMesh™ may be referred to as "EM", WiFi EasyMesh™ Controller may be referred to as an "EM Controller", and WiFi EasyMesh™ Agent may be referred to as an "EM Agent."

Figure 1:
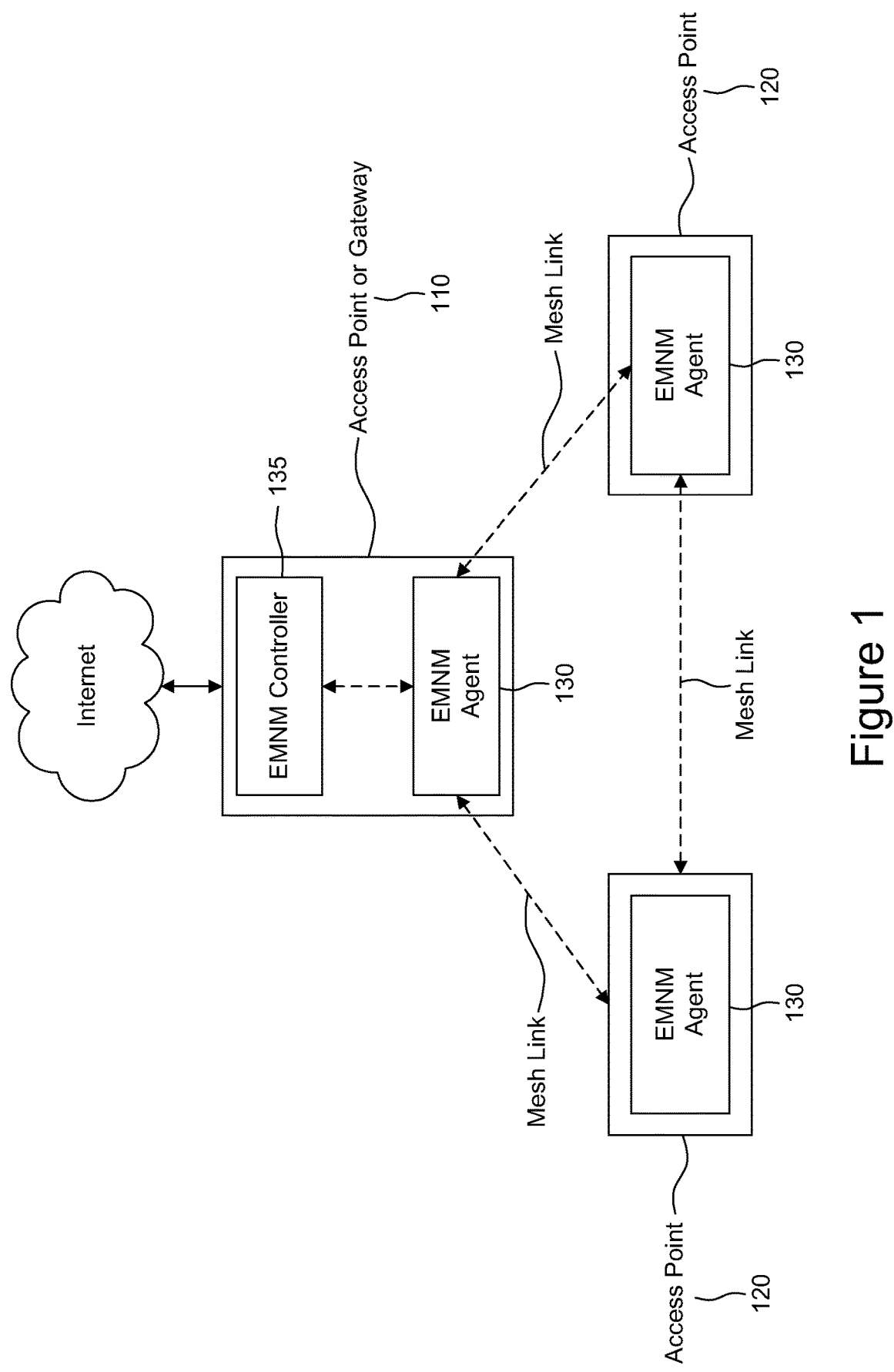
FIG. 1 is an illustration of a mesh network topology including enhanced mesh network management (EMNM) agents according to one embodiment.

Referring to FIG. 1, a mesh network topology that employs an exemplary embodiment of the EMNM described herein is shown. An access point (AP) or gateway (GW) 110 is in mesh communication with one or more APs 120. The AP or GW 110 may be a combined AP/GW. AP/GW 110 and APs 120 include a processor that is running an EMNM agent 130. The EMNM Agent 130 includes code and functionality that enables the EMNM extensions described herein, including the capability to send and receive the above-mentioned series of EMNM-specific IEEE 1905.1 messages. AP/GW 110 also includes an EMNM Controller 135. Although FIG. 1 shows an EMNM agent 130, it should be understood by the reader that this is an EasyMesh specific implementation of the inventions described herein, and a generic EMNM agent running on top of a variety of other standards is covered by the inventions described herein.

Figure 2:
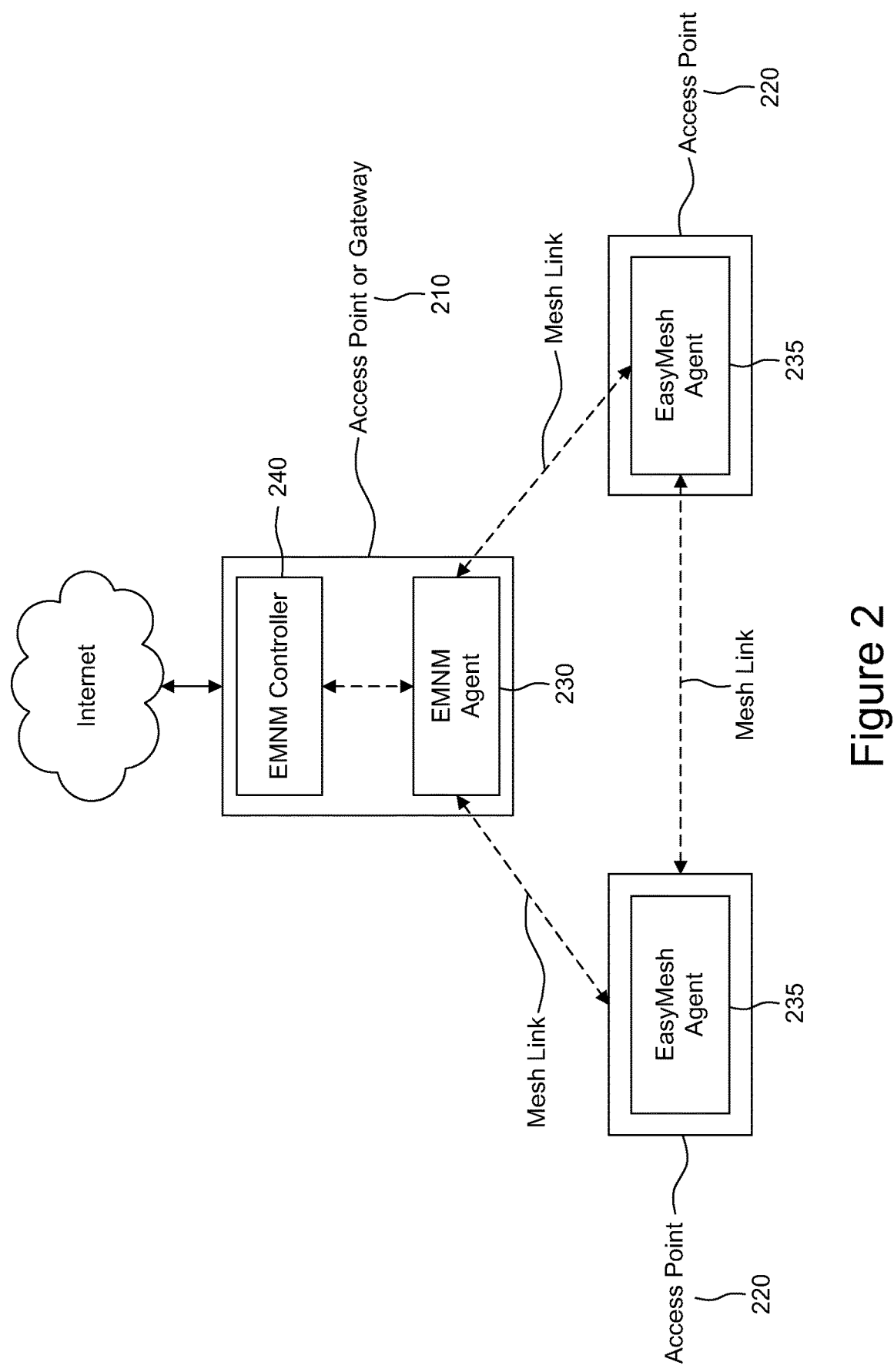
FIG. 2 is an illustration of a mesh network topology including enhanced mesh network management (EMNM) agents and EasyMesh agents according to one embodiment.

Referring to FIG. 2, a mesh network topology is shown that includes an AP/GW 210 running an EMNM Agent 230 in mesh communication with APs 220 that are running EasyMesh Agents 235. The EasyMesh Agents 235 may not support all or any of the EMNM features that are supported by the EMNM Agent 230. In FIG. 2, some device Agents support EMNM extensions and other device Agents do not support EMNM extensions but regular WiFi EasyMesh™.

It should be noted that the systems and features presented in this application are transparent to the underlying network topology as EMNM delivers enhancements to network management and not to the various underlying network protocol stacks. Network device nodes that operate in a start topology or a full mesh topology may be managed by a network management technology, such as EMNM, in an identical way.

Figure 3:
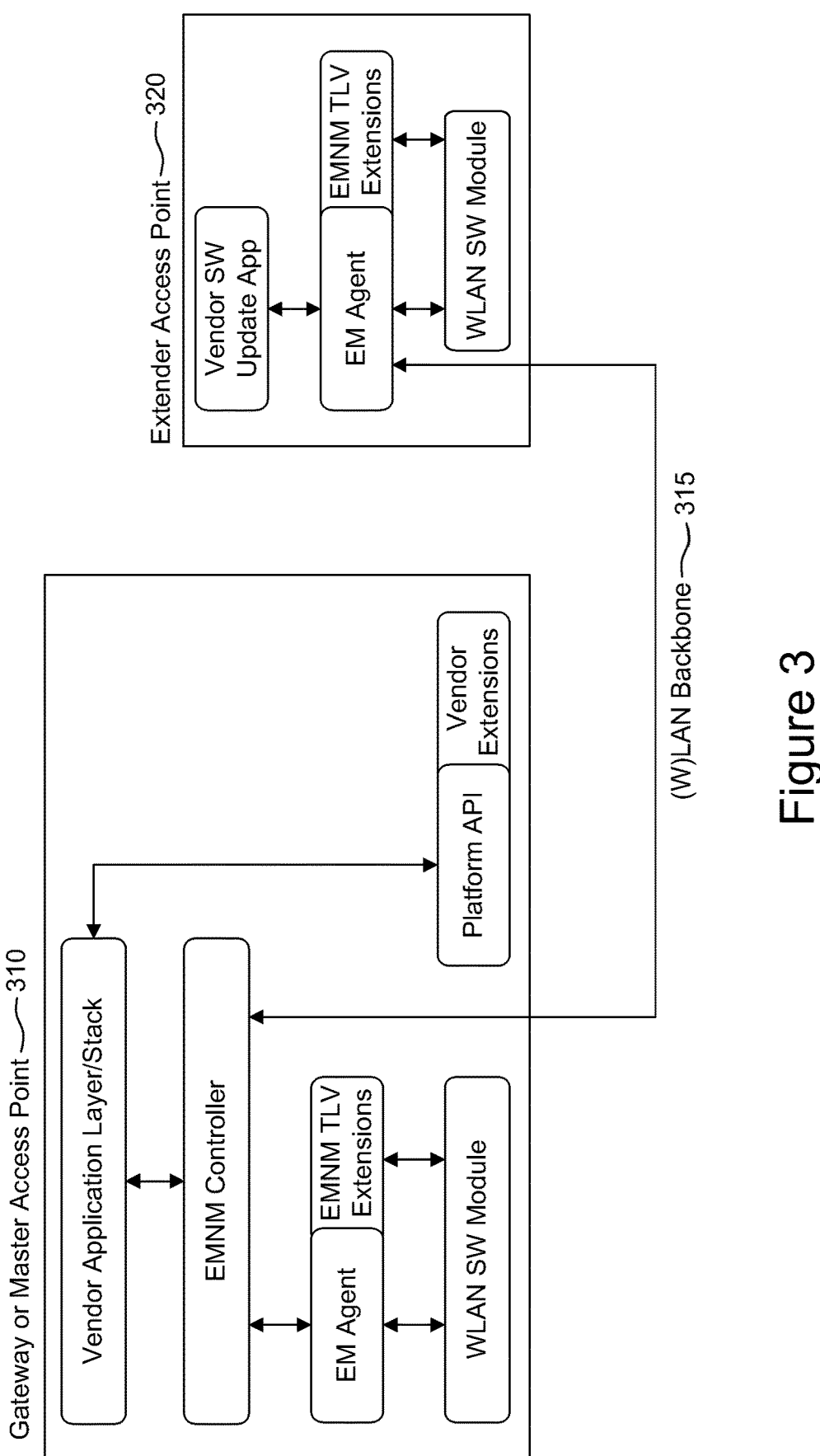
FIG. 3 illustrates an exemplary system architecture.

Referring to FIG. 3, an exemplary system architecture is shown. A gateway or master AP 310 is shown in communication via a WLAN or LAN backbone connected to an extender AP 320. EMNM is used to perform network management and data collection in a uniform/standardized way but with some extensions as defined in herein.

Third party integrators may deliver a binary software development kit (SDK) that comprises an EMNM Controller and a series of other applications. A software binary interfaces with the gateway over a platform vendor API to fetch its default configuration and items related to the integration of executable modules (such as the EM Controller) in the operating system of the Gateway 310.

The EMNM Agent and Controller extensions may be delivered as a requirement specification with clear indication of what parameters third party integrators need to fetch from the underlying platform and how they should report the result via EMNM TLV extensions.

EMNM Agents and Controller communicate over an IEEE 1905.1 protocol stack as defined in EasyMesh and IEEE 1905.1 standards and also in this disclosure. IEEE 1905.1 communication is used between Agents and Controller irrespective of the location of the Agent in the system architecture. As such, the Gateway Agent may not communicate via IEEE 1905.1 with the Controller and not via an internal bus.

An important aspect of the embodiments described herein is that backwards compatibility with WiFi EasyMesh™ is maintained. The target of implementing EMNM via vendor-specific extensions is that both the Controller and the Agents remain WiFi EasyMesh™ certifiable but that they also support additional features as defined by the vendor.

All WiFi EasyMesh™ features that exist in the standard may remain supported leaving the option for non-EMNM Agents to connect to the network controlled by a Controller that implements the EMNM. So, legacy WiFi EasyMesh™ devices will be operable but may not participate in the full feature set offered by EMNM.

EMNM features may be implemented by extending the network management message set and the TLV (type, length, value) parameter space and by altering (or defining) the behavior of a device Agent.

As compatibility with WiFi EasyMesh™ is imperative, EMNM Agents may not enable any of the EMNM features/extensions in an out of the box (OOB) state. Only an EMNM Controller may trigger the EMNM Agents to enable features. As such, EMNM Agents may not interfere with WiFi EasyMesh™ certification.

The EMNM Controller may collect information from the EMNM Agents/EasyMesh Agents in a network to determine the least common denominator of the feature set that is supported by the EMNM Agents/EasyMesh Agents. Based on the collected information, the EMNM Controller may limit its features accordingly to avoid a scenario where STAs connect to devices with a less capable EMNM Agent/EasyMesh Agent, the STA may not get more or less supported features. Based on the information, a vendor application stack on top of the EMNM Controller must limit its features accordingly to avoid a situation where a STA connects to devices with a less capable EMNM Agent, or even EM Agent, the STA will not get different features throughout the network. As such, the least capable EM or EMNM Agent will limit the feature set for the rest of the network.

The EMNM Controller however may report EM or EMNM Agent capabilities thus allowing a cloud-server or cloud-controller to determine why some networks do not use the full EMNM potential. A cloud-server or cloud-controller may reside in the Internet as shown in FIGS. 1, 2, and 3.

The least common denominator principle of operation implies that a single Agent can force the whole network to not use more advanced features. This simplifies the network operation as otherwise a hybrid network would be the result of mixing and matching EM Agents with EMNM Agents or different versions of EMNM Agents. The EMNM Controller may thus be required to parse the EM profile value and the capabilities announced by the EMNM Agents and report that capability to the vendor application layer. The vendor application layer may adjust its operation based on the least common denominator of EM or EMNM Agent capabilities.

The methods and systems presented in this application provide a method to extend a WiFi EasyMesh™ system. As such, EMNM-specific TLV extensions may be used to extend a WiFi EasyMesh™ system. As WiFi EasyMesh™ employs IEEE 1905.1 as a message exchange layer, EMNM TLV extensions are described herein. A vendor specific TLV is defined in IEEE 1905.1 2013 section 6.4.2. The TLV type to be used for a vendor specific TLV may be "11".

The Organizationally Unique Identifier (OUI) to be used to identify the EMNM specific EMNM TLV may be the vendor OUI that implements the enhanced mesh network management feature set, e.g., "8841FC", to be filled in the TLV-value section of the TLV message.

The methods and systems presented in this application provide a method to extend a WiFi EasyMesh™ system. As such, EMNM—specific message extensions may be used to. As WiFi EasyMesh™ employs IEEE 1905.1 as a message exchange layer, EMNM message extensions are used. When requested, a device implementing an EMNM Agent or Controller may send an EMNM proprietary message. While IEEE 1905.1 may allow several options to create custom message extensions—see for example Table 1—(e.g. vendor specific messages or reserved messages) the concept of a custom message complies with a few rules: (1) A message may be uniquely relatable to EMNM or a device compliant with EMNM and differentiable from WiFi EasyMesh™ message. By way of example, a vendor/implementer may choose to include an organization-specific field (e.g. OUI or message ID unique to an organization). (2) Each message shall be uniquely identifiable to prevent confusion at the message recipient side on how to parse the message. Messages use a strictly defined TLV order and content. As such, by being able to uniquely identify a message, the receiver is able to parse the message. An implementer may choose to create a unique message ID that is either directly embedded in the IEEE 1905.1 message type field or in the payload field of a vendor specific IEEE 1905.1 message as vendor-specific subfield.

To allow evolution in the feature set of the EMNM, the EMNM Agent may report its supported feature set via an EMNM TLV, "Feature Profile". This TLV may be sent together with the standard WiFi EasyMesh™ TLVs in an AP Capability Report message and a 1905 AP-Autoconfig Search message, and the 1905 AP-Autoconfig WSC (M1) message, for example. The feature profile may be modelled as a release indicator and feature list. The feature profile may be constructed as illustrated in the simple (pseudo) json structure (JavaScript Object Notation is a lightweight data-interchange format) example below:

```
featureProfile: {
  version: 0x0001,
  featureList: [0x000f, 0x000A,...]
}
```

EMNM features may be updated to fix bugs or to include a new way to interpret them. The global EMNM Agent version may not be sufficient to identify what iteration of a specific feature is supported by an EMNM Agent. As such, EMNM features supported may be reported as a byte field value (or series thereof), where the version (iteration) of a feature may be represented as a combination of the ID of a feature and its dedicated feature version, as defined in Table 2.

An EMNM Agent may include the features it supports in the EMNM Feature Profile TLV (with their respective versions) when reporting its capabilities to the EMNM Controller. Those EMNM features as well as their descriptions are listed below in Table 2.

TABLE 2

| EMNM Feature ID | | | |
| --- | --- | --- | --- |
| Feature | Feature ID | Feature version | Description |
| EMNM feature | 1 | 0 | feature description |

As such, an example device Agent compliant with EMNM could report the following feature capabilities:

TABLE 2.5

| Example EMNM Feature ID | | |
| --- | --- | --- |
| Feature | Feature ID | Feature version |
| EMNM Probe monitor | 1 | 2 |
| EMNM Unassociated STA signal strength monitor | 2 | 1 |
| EMNM CPU load | 3 | 4 |

An EMNM Agent may announce its capability to report the support status of EMNM features via the EMNM Feature Profile TLV. The EMNM Controller may first verify whether an EMNM Agent supports the feature and then provision the configuration for a feature in the EMNM Agent.

An EMNM Controller may not configure an EMNM feature via the EMNM Metric Reporting TLV for an EMNM Agent that does not indicate support for the feature that the EMNM Controller intends to configure.

An EMNM Agent that receives EMNM information from the EMNM Controller, for a feature that has not been announced as supported may discard the configuration information received from the EMNM Controller for that feature.

The EMNM version indicator may be defined as a big endian 4-octet value representing an integer to indicate the master version of the EMNM Agent and the EMNM feature list, defined as a list of supported EMNM features, represented as big endian 4 octet values.

Figure 4:
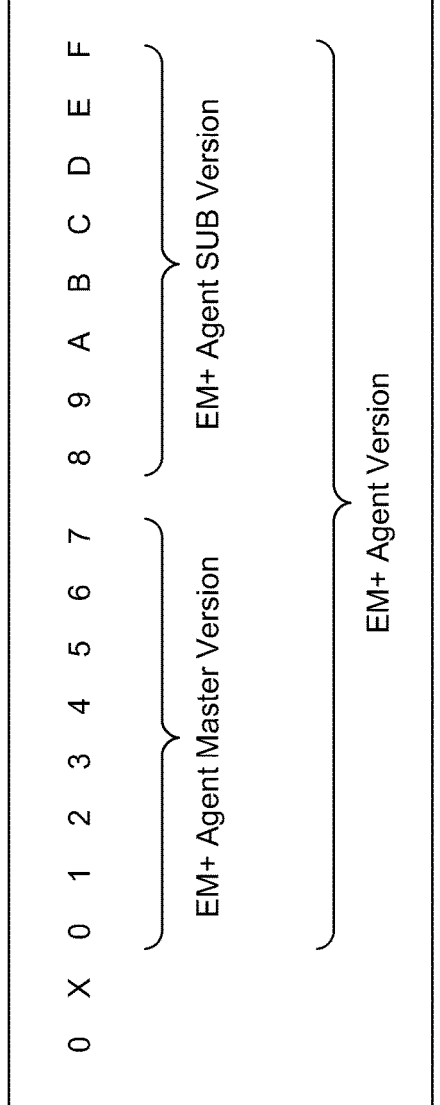
FIG. 4 is an example of an EMNM version indicator according to one embodiment.

The EMNM Agent version may be defined as a 4-octet value, where the 2 highest octets represent the master version and the 2 lowest octets represent the subversion, as illustrated in FIG. 4.

As an example, EMNM Agent version 4.21 (4=master version, 21=subversion) may be represented as 0x00040015.

EMNM features can be updated to fix bugs or to include a new way to interpret them.

Figure 5:
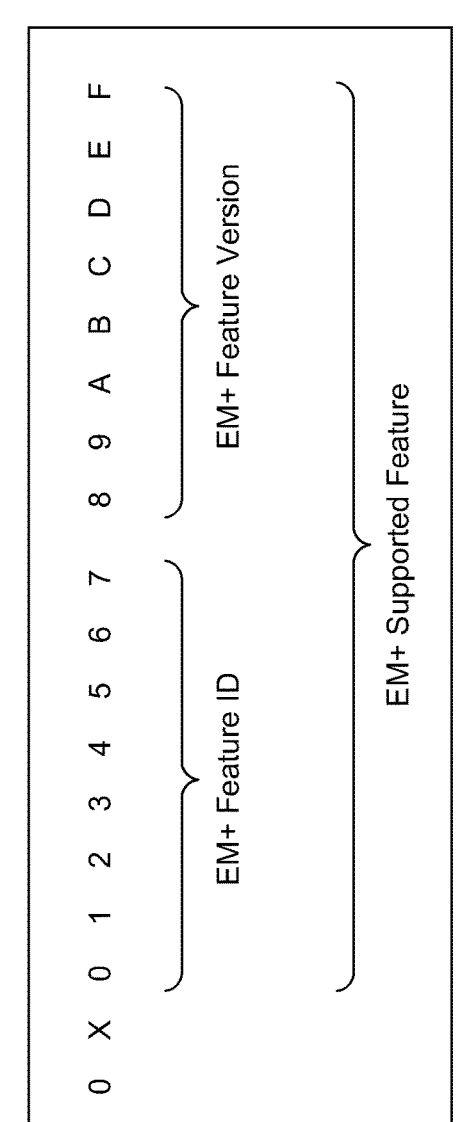
FIG. 5 is an example of an EMNM feature indicator according to one embodiment.

The global EMNM Agent version is not sufficient to identify what iteration of a specific feature is supported by an EMNM Agent. As such, EMNM features supported shall be reported as a big endian 4-octet value, where the 2 lowest octets shall represent the version (iteration) of a feature and where the 2 highest octets shall represent the ID of a feature, as defined in Table 3 and illustrated in FIG. 5.

As an example, the 5th version/iteration of the EMNM Device Info feature may be represented as 0x00030005.

An EMNM Agent may include only the features it supports in the EMNM Feature Profile TLV (with their respective versions) when reporting its capabilities to the EMNM Controller.

TABLE 3

| EMNM Feature ID Definition | | |
| --- | --- | --- |
| 1905.1-2014 | 2 | Announce support for IEEE 1905.1-2014 |
| EMNM Device Info | 3 | Report a Device specific information (client ID, product class, role . . .), |
| EMNM ethernet stats | 4 | Report statistics for LAN Ethernet connections |
| EMNM coordinated firmware update | 5 | Support for the EMNM coordinated software update mechanism, |
| EMNM triggered reboot and/or factory reset of device | 6 | Support for triggered reboot/reset |
| WiFi 6 Capability reporting | 7 | Support reporting of extended WiFi 6 AP and STA capabilities/Status |
| DPP B.STA and Agent onboarding | 8 | Support for EMNM DPP-based Agent (B.STA) onboarding as defined in this specification |
| STP support | 9 | Indicate EMNM Agent's support for STP, |
| Extender debug logging trigger | 10 | Support remote trigger to enable/disable event logging for extender |

In an embodiment, EMNM Scan scheduling is utilized. Station monitoring is a feature that may be implemented by an EMNM Agent. The goal is that the EMNM Agent may monitor both off-channel STAs and on-channel STAs and report back a collection of data of the STAs monitored. Reporting of the measurements may be done through the EMNM defined reporting mechanism.

The report itself may be achieved through a collection of EMNM specific TLVs tailored to what is being reported and/or WiFi CERTIFIED EasyMesh™ TLVs. Examples of reportable data based on scheduled measurement intervals are described as follows: unassociated STA RSSI, reported by the EMNM Unassociated STA Monitor Response TLV; medium usage (TX time, RX time IBSS, RX time OBSS, Interference), reported by Radio Monitor Response TLV; scan report of neighboring networks via a WiFi EasyMesh™ Channel Scan Report message and TLV; and probe monitor information reported through the EMNM probe monitor response TLV.

The goal is that all channel measurements are executed in a coordinated fashion via a single, scheduled, "measurement window" instead of a measurement window per single measurement.

The APs under control of the EMNM Agent may implement the scan scheduling mechanism, allowing the EMNM Agent to coordinate which measurements to execute when and in what way.

Figures 6, 7:
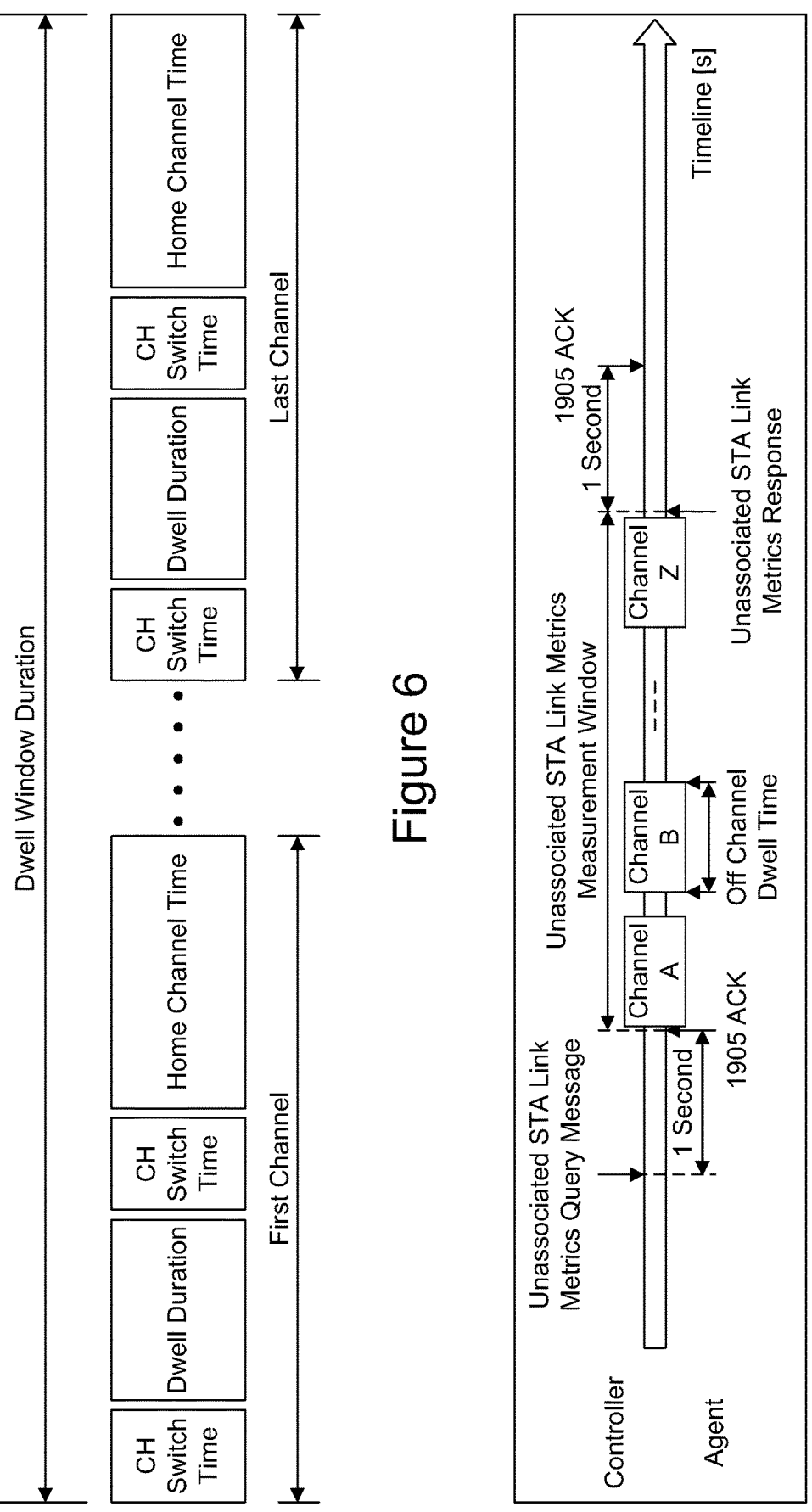
FIG. 6 is an illustration of a scan scheduler according to one embodiment.
FIG. 7 is a depiction of a measurement timeline according to one embodiment.

The scan scheduler in the AP may use all reported Operating Class values for all bands as input to determine what channels are supported by the AP. Based on that input, the scan scheduler in the AP may cycle through the channels supported in a round robin fashion, as illustrated in FIG. 6.

The scan scheduler may scan all channels in the operation class of a radio for a configurable dwell duration. A check may be made by the AP to determine whether there is an active traffic session or not. If during a configurable home channel time window, the AP detects active traffic, no scan may be executed, and a new slot shall be sought to perform the off-channel scan. While operating on a specific channel, the AP may record not only radio (environment) related data but also the data that relates to unassociated STAs, based on a list of MAC addresses that has been provisioned by the EMNM Agent via the EMNM Controller.

Each AP may distribute its scan windows based on traffic detection over the reporting period. The goal is that a configurable aggregate dwell window duration per channel may be achieved (aggregated out of fragmented scans that are defined by the per radio dwell duration) per reporting period.

In an exemplary embodiment, the scanning module may be configured as defined in Table 4.

When data is collected, the EMNM Agent may report the data back as configured to the EMNM Controller. There may be several types of reports, typically there are fast reports and long-term reports which are related to reporting intervals. Next to periodic reports, there are reports of the "on-demand" nature which are discussed separately in this application. All data that relates to STA data (e.g. unassociated RSSI) may be reported at the "STA stats Reporting Period" interval (e.g. 1 second as defined in the WiFi EasyMesh™ Metric Reporting Policy TLV) whereas all Radio stats, including scan reports, may be reported via the long-term "Radio Reporting Period" as defined in the Scan Scheduler Policy TLV.

TABLE 4

Scan Scheduler Configuration

| Parameter | Description |
| --- | --- |
| Dwell Duration per radio | Defines the off-channel scan window time a radio needs to implement |
| Home Channel Time per radio | Defines the operational channel scan window time a radio needs to implement |
| Total Traffic Threshold per radio | Defines the data traffic threshold above which a radio should defer its scheduled off-channel scan window |
| Dwell Window Duration | Defines the aggregate reporting window time |
| Radio Reporting Period | Defines the aggregated reporting window per channel per radio |
| Channel Switch Time per Radio | Defines the measurement idle period a Radio must implement when switching between operational and off-channel measurements |
| Scan Bandwidth per Radio | Defines the channelwidth with which a radio shall perform its measurements during a scan window |

TABLE 4-continued

Scan Scheduler Configuration

| Parameter | Description |
| --- | --- |
| Unassociated STA target List | Defines a list of target STAs for which a radio should collect information during its scan window |

While the STA stats (e.g. unassociated RSSI) reports may contain single measurements, the radio reports may contain an array of measurements (number of measurement=Radio reporting period/dwell window duration) per channel per radio.

An EMNM Controller may issue a WiFi EasyMesh™ Scan Reporting Policy TLV in the WiFi EasyMesh™ Multi-AP Policy Config Request message to indicate that an EMNM Agent may send independent channel scan reports. While performing scans as instructed by the scan scheduler, the EMNM Agent may collect information about the presence of neighboring networks in a channel. This information may be aggregated into a WiFi EasyMesh™ Channel Scan Report message and sent to the EMNM Controller every radio reporting period.

An EMNM Controller may instruct an EMNM Agent to enable independent channel scan reporting when the EMNM Agent reported that it supported the scan scheduling feature.

Besides a periodical scan, the EMNM Implementation may support a triggered "poll" for information.

As an example, the EMNM Implementation is required for real time applications such as a client steering daemon. When a periodic scan mechanism is in place, there may be a scenario where the periodicity of the scanning results in a lag before new data is assessed for an unassociated STA.

As this is an impractical condition for a real time algorithm, an EMNM architecture may support a trigger to instruct the EMNM Agent to perform a measurement (e.g. for unassociated signal strength) immediately for a specific target STA. As such, the trigger sent by the EMNM Controller may overrule the scheduled scan mechanism. After the triggered response has been sent by an EMNM Agent, the scan scheduler may be allowed to work as configured.

An EMNM Controller may be able to query instantaneous measurement reports by issuing an EMNM specific message, "Measurement Report Query" towards an EMNM Agent. All EMNM Agents may support the reception of the query message. How an EMNM Agent replies depends on the capabilities it announced via the EMNM Feature Profile TLV.

If an EMNM Agent supports a specific query request, it may perform the requested measurement upon reception of the request, overruling the current state of the scheduler.

An EMNM Measurement Report Query message is an example of an EMNM message extension as defined earlier.

An EMNM Controller may issue an EMNM Measurement Query message with an EMNM Measurement Report Query TLV to indicate what the desired action is for the receiving EMNM Agent.

The EMNM Measurement Report Query TLV contains 2 fields: (1)_Measurement Report ID, a byte field that identifies uniquely which measurement report shall be replied by the EMNM Agent; and (2) Target MAC, a byte field that identifies for which device a measurement report shall be replied by the EMNM Agent.

The content of the EMNM Measurement Report Query TLV may differ from use case to use case. Some examples of the EMNM Measurement Report Query TLV are described below.

EMNM Probe Monitor: The EMNM Controller may provide the correct Measurement Report ID and a target MAC address that matches the address of the EMNM Agent. When the EMNM Agent receives this information, it may reply with the current status of the EMNM probe monitor for all radios managed by the EMNM Agent.

EMNM Advanced Metrics: The EMNM Controller may provide the correct Measurement Report ID. When the target EMNM Agent receives this information, it may reply with the current status of the EMNM Advanced Metrics report for the device managed by the EMNM Agent.

EMNM Unassociated STA Monitor: The EMNM Controller may provide the correct Measurement Report ID and a target MAC address that matches the address of the STA for which a report is required. When the EMNM Agent receives this information, it may reply with the unassociated STA RSSI monitor report for the target STA.

EMNM Radio Monitor: The EMNM Controller provides the correct Measurement Report ID and a target MAC address that matches the address of the EMNM Agent. When the EMNM Agent receives this information, it replies with the current status of the Radio monitor for all radios managed by the EMNM Agent.

An EMNM Agent receiving an EMNM Measurement Report Query message may reply within a predetermined time period, for example, one second, with an IEEE 1905.1 ACK message to the EMNM Controller to signal that the request has been received correctly and then starts processing the request to reply as fast as possible.

In an exemplary embodiment, the measurement reports that the EMNM Controller may be able to query are defined by a measurement-unique ID.

An EMNM Agent may support Unassociated STA Link Metrics on the channel its BSSs are currently operating on, and Unassociated STA Link Metrics on the channels its BSSs are currently not operating on.

An EMNM Agent may implement a 1 second (for example) unassociated STA link metric collection time-out irrespective of the channel the measurement is executed on.

For off-channel measurements specifically, an AP may never be off-channel longer than a maximum of off channel dwell time during the 1 second measurement collection window. Hence the measurement window may consist of series of fragmented scan periods in which the AP tries to collect the RCPI value of an unassociated STA that operates on a different channel than the AP executing the measurement currently operates on.

TABLE 5

| Max off-channel dwell time for unassociated RCPI measurements | |
| --- | --- |
| MAX Off-channel dwell time RCPI measurements | Default value |
| Dwell duration 2.4 GHz | 20 [ms] |
| Dwell duration 5 GHz | 20 [ms] |

An EMNM Agent may respond no later than 2 seconds (for example) after reception of an EMNM Controller's unassociated STA Link Metrics Query message with a STA Link Metrics response message. The measurement timeline is illustrated in FIG. 7. The time in seconds shown in FIG. 7 is exemplary.

EMNM may support an IEEE 802.11(e) BSS Load Element. All BSSIDs managed by an EMNM Agent may enable the IEEE 802.11 BSS Load Element as defined in section 9.4.2.28 of IEEE 802.11-2016. The EMNM Agent may indicate that the IEEE 802.11 BSS Load Element is enabled and may report all items linked to them as defined in WiFi EasyMesh™, section 17.2.40, via the Channel Scan Report message.

EMNM may support Off-channel scan dwell time for CCA assessment. A vendor application stack may trigger an EMNM Controller to instruct the EMNM Agents to execute an off-channel channel scan to assess the channel utilization of such a channel.

The definition in EasyMesh, section 17.2.39 indicates that an EMNM Controller cannot request a dwell time per channel scanned in the EasyMesh Channel Scan Request TLV. The EMNM Agent is however capable of reporting the aggregate scan duration via the EasyMesh Channel Scan Result TLV.

To match an EMNM Aagent's behavior to the requirements that drive the data collection via channel scanning, a vendor may define off-channel scan dwell times per band that a radio operates on.

EMNM Agents may comply with that requirement listed in Table 6 and report the effective aggregate scan duration in the EasyMesh Channel Scan Result TLV with which the results of the most recent scan are reported.

TABLE 6

| EMNM Edge Off-channel scan dwell time | |
| --- | --- |
| Off-channel dwell time CCA measurements | Default value |
| Dwell duration 2.4 GHz | 30 [ms] |
| Dwell duration 5 GHz | 30 [ms] |

EMNM may support IEEE 1905.1 interface identification. As defined in the WiFi EasyMesh™ specification, EM Agents controlling a WiFi CERTIFIED 6™ AP must report the "Wi-F 6" PHY type when identifying an interface in the Device Information Type TLV that is sent with the IEEE 1905.1/WiFi EasyMesh™ Topology Response message. EMNM Agents implement this definition, regardless of the feature being tested in the EM certification test plan.

To report WiFi 6 radios operating on different bands, the following approach may be applied by an EM Agent. A 1905 topology response message contains: device information type TLV that contains a media type (2 octets) and a media-specific information (variable number of octets). An exemplary WiFi 6 radio interface may be reported as follows: Media type=0x0108, Media-specific info includes, BSSID, Role: 0x0 or 0x4→indicating that it is an access point or non-AP (STA), apChannelBand→hex value of IEEE 802.11, dot11CurrentChannelBandwidth, apChannelCenterFrequencyIndex1→hex value of IEEE 802.11 dot11CurrentChannelFrequencyIndex1, and apChannelCenterFrequencyIndex2→hex value of IEEE 802.11 dot11CurrenChannelFrequencyIndex2 (used to signal 80+80 operation).

EMNM Agents may report the presence of non-WLAN interfaces as part of an IEEE 1905.1 Topology Response message. Whenever a topology response message is due, the agent may insert all interfaces present on the platform in the IEEE 1905.1 Device Information Type TLV, not just the WLAN interfaces.

Figure 8:
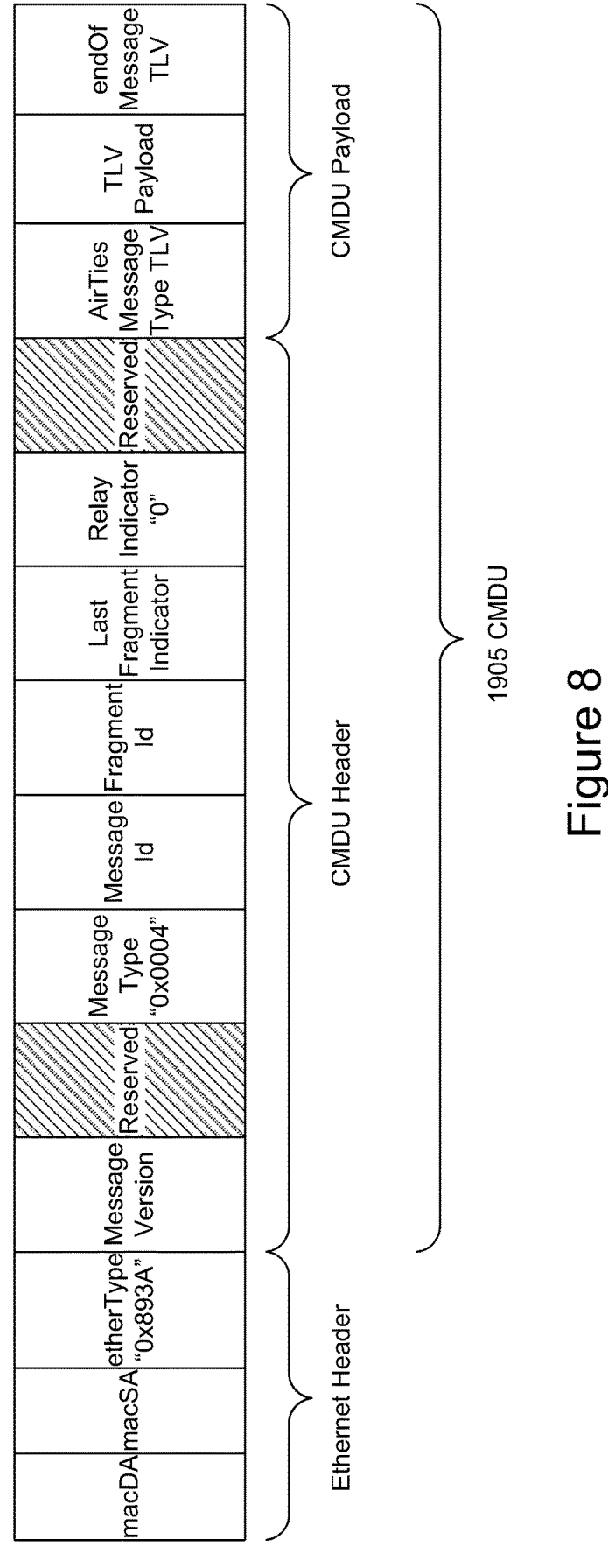
FIG. 8 shows an example of an EMNM specific IEEE 1905.1 messages according to one embodiment.

EMNM may support EMNM specific 1905.1 messages. EMNM Agents and Controller may have the ability to send "EMNM specific" 1905.1 frames. The EMNM specific frame type may be identified with IEEE 1905.1 message type value 0x0004, and it may be transmitted in unicast mode, unless stated otherwise in this document. An example of the EMNM specific IEEE 1905.1 message structure is shown in FIG. 8.

EMNM-specific IEEE 1905.1 messages are identified by the "EMNM message Type TLV", the first TLV of the CMDU payload. The EMNM message Type TLV is a vendor specific TLV 1905.1 TLV carrying the custom EMNM message type indicator.

The EMNM message indicator is a 2-octet unsigned integer. Each EMNM message may be assigned a unique EMNM message Type value.

EMNM may support a retry policy for EMNM messages. The EMNM Controller may retry the transmission of a 1905.1 message that has not received a 1905.1 ACK 6 times with a 5 seconds interval as long as no 1905 ACK is received from the EMNM Agent, unless a different retry behavior is explicitly mentioned in this document.

EMNM may support an EMNM Device Metrics message exchange. Additional data may be required to be mined from the various EMNM compatible devices (for example, access points, gateways, extenders, stations, etc.) An EMNM Device Metrics message may include extra device "metrics" to be reported, and may include the following.

Device temperature may be reported in an EMNM Device Metrics message. The sampled temperature of the device, in degrees centigrade for example, to be reported as an unsigned integer between 0 and 255.

Device CPU load may be reported in an EMNM Device Metrics message. The sampled CPU load of the device, all cores combined, to be reported as an unsigned integer between 0 and 100 with 0 being 0% load and 100 being 100% load.

Device memory may be reported in an EMNM Device Metrics message. The sampled memory count of the device to be reported as kibibyte via an unsigned integer.

Uptime may be reported in an EMNM Device Metrics message. The uptime of an AP at delivery of the sampled metrics may be reported.

Device temperature may cover the most common temperature sensors available on a WLAN platform being the CPU, and all WLAN chipsets.

The temperature may be reported in an array where the RADIO ID is used to indicate what temperature matches with what radio. The CPU is reported under the EMNM Agent ID globally.

Device CPU load may be modelled as the reciprocal of the fraction of idle time, compared to the total CPU time (expressed in USER_HZ), scaled to 100[%], for the monitor window. This may be given by the following equation.

$$CPU\ load = \left(1 - \left(\frac{\Delta idle\ time}{\Delta total\ cpu\ time}\right)\right) \times 100$$

Total CPU load is the sum of user process time, system process time, I/O wait time and all IRQ-related time consumed during the monitor window. Linux kernel reports this data via/proc/stat, which may be used as a reference. Total CPU, based on/proc/stat, may be defined as the sum of: (1) user (normal processes executing in user mode); (2) nice (niced processes executing in user mode); (3) system (processes executing in kernel mode); (4) idle (time spent in the idle task); (5) iowait (waiting for I/O to complete); (6) irq (servicing interrupts); (7) softirq (servicing softirqs) info based on the Linux proc filesystem.

EMNM may support a device memory EMNM device metrics message. Device memory may cover memory used (the total amount of memory in the AP's RAM in terms of kibibytes as an integer), memory free (the sum of memory that is available to a process, should a process request more memory) and the cached memory (the cached amount of memory in the AP's RAM in terms of bits as an integer).

EMNM may support an uptime measurement. Uptime may be defined by a timer (unsigned integer) that starts at 0 and increases monotonically with 1 each second that elapses after boot of the platform managed by an EMNM Agent. The timer may be reset at boot of a platform.

An EMNM Controller may verify that an EMNM Agent supports EMNM Device Metrics feature, by inspection of the announced EMNM Agent capabilities, advertised via the EMNM Feature Profile TLV in the 1905 AP-Autoconfiguration Search and AP Capability Report messages.

The EMNM Agent may report the advanced metrics in a dedicated EMNM report/response TLV, EMNM Device Metrics TLV. All metrics may be reported as an extra TLV that is sent along with the standard EM TLVs in the AP Metrics Response message.

EMNM may support the exchange of Device Information. To allow decent profiling of the network nodes, for network management purposes, the EMNM Agent may be instructed to provide inventory information for the network node that is managed by the EMNM Agent: Product class, Chipset ID as complementary information to regular onboarding information. The items that may be reported are defined in Table 7.

TABLE 7

Exemplary Device Info parameters

| Parameter | Description |
|---|---|
| Boot ID | pseudo rando number that is updated when a device managed by an EMNM Agent boots. |
| Client ID | The client ID to identify the EMNM agent application to the authentication server. The ID is specific to a version of the EMNM agent |
| Product Class | Identifier of the class of product for which the serial number applies. That is, for a given manufacturer, this parameter is used to identify the product or class of product over which the Serial Number parameter is unique. Consists of a bitflag whereby: 0x1 (gateway) a device that fulfils the broadband gateway function 0x2 (extender) a device capable of extending/repeating the network. The actual backhaul type used is not relevant, a pure AP that uses a wired backhaul is also labelled as extender 0x3 (stb) a set top box, a special case of "video" and/or "sta" and/or "extender" |

TABLE 7-continued

Exemplary Device Info parameters

| Parameter | Description |
|-----------|-------------|
| Role | Indicates the effective role a device takes on in the EMNM network after leader election or static configuration. By default, all devices reporting product class gateway may report the role "controller". Any other device product class shall by default report "agent" role. Leader election (dynamic or static) may change these roles. Role consists of a Boolean that is true (1) in case of a controller role or (0) in case of a regular agent role. |

An EMNM Agent may indicate that it supports reporting device info parameters by announcing the EMNM Agent capabilities, advertised via the EMNM Feature Profile TLV in the 1905 AP-Autoconfiguration Search and AP Capability Report messages An EMNM dedicated TLV, EMNM Device Information TLV, may be used to report these values. The EMNM Device Information TLV may be added to the WiFi EasyMesh™ AP Capability Report message by the EMNM Agent to report an EMNM Agent's info.

EMNM supports an EMNM Ethernet Stats message. Wired, e.g., 802.3 Ethernet, hosts may also be monitored by an EMNM Agent. Note that these wired connections don't need to be backhaul interfaces, any wired interface may be reported. Any wired connection is identified by the MAC address of an interface and the (Linux bridge) interface name. In case for example an Ethernet switch is used, a single MAC address may be reported with multiple (Linux bridge) interface names (e.g. eth0-3).

An EMNM Agent may collect the following information with respect to Ethernet hosts in the LAN that are connected to the EMNM Agent: Bytes Sent: the total number of kibibytes transmitted to the host device in each category Unicast/Multicast/Broadcast; Bytes Received: the total number of kibibytes received from the host device in each category Unicast/Multicast/Broadcast; Packets Sent: The total number of packets sent to the host device in each category Unicast/Multicast/Broadcast; Packets Received: The total number of packets received from the host device in each category Unicast/Multicast/Broadcast; an interface type: 0-6 where 0=unknown, 1=10 Mbps, 2=100 Mbps, 3=1 Gbps, 4=2.5 Gbps, 5=5 Gbps, 6=10 Gbps.

An EMNM Agent may indicate in the EM Profile-2 AP Capabilities TLV that kibibyte (KiB) is applicable on all reported traffic statistics to avoid that the byte counters wrap around too quickly.

An EMNM Agent may report these statistics in a dedicated EMNM TLV, EMNM Ethernet Stats TLV which may be inserted in the WiFi EasyMesh™ AP Metrics Response message.

An EMNM Agent that has not announced its capability to support Ethernet Host Stats via the EMNM Feature Profile TLV in the 1905 AP-Autoconfiguration Search and 1905 AP-Autoconfiguration WSC messages, may not send Ethernet Stats.

EMNM may support information exchange regarding support for Spanning Tree Protocol (STP). EMNM platforms may support STP as defined in IEEE 802.1D or more recently 802.1Q-2018 (RSTP) to prevent breaking the network with broadcast/multicast storms when Ethernet cables are sporadically being plugged in. An EMNM Agent may report if that platform has STP enabled or not in the EMNM Feature Profile TLV.

A platform's STP function may prefer to use wired connections over wireless connections when a decision needs to be taken to decide what interface to put in forwarding or blocking state. EMNM defines STP defaults as indicated in Table 8.

TABLE 8

EMNM STP default settings

| STP Parameter | Value [s] |
|---------------|-----------|
| Hello time | 1 |
| Forwarding Delay | 2 |
| Max age | 20 |

Next to the STP parameters, in one embodiment, the 2-octet bridge priority may be implemented as 0x8000 for extenders, and 0x7FFF or lower for a gateway.

When VLAN support is enabled on a device, STP may be run on every VLAN segment. The outcome of the primary VLAN segment may be implemented first and not be overruled by the outcome for a secondary VLAN segment. A secondary VLAN segment cannot unblock an interface that has been blocked in the primary VLAN segment. Within the secondary VLAN segment, the same rule of priority may be applied, using the VLAN-ID value as priority indicator. The lowest value has the highest priority. If as such a blocking conclusion is determined for a secondary VLAN-ID with value 2, another VLAN-ID with value 5 may not be able to remove the prior blocking decision.

EMNM may support a Probe monitor information exchange.

Client steering methods rely on a feature that may be called a "probe monitor." The probe monitor concept may be defined as an array of all IEEE 802.11 probe request frames that were received during a defined time window by a specific AP. Each probe request frame may be stored in that array in a meta-data format, namely as an entry with, for example, the MAC address of the STA RSSI and Channel of the received frame and a timestamp depicting the time of reception of the probe request frame.

As such, the EMNM Agent may collect an overview of associated and unassociated STAs seen with an age reference so that the measurement data can be put in perspective when using it.

The EMNM Agent may populate the EMNM Probe Monitor Response TLV and update the measurement time. The EMNM Agent may add values to the EMNM Probe Monitor Response TLV when they have been updated during the measurement window. Otherwise, an entry may not be added. Probe request frames may be recorded during monitoring on the current operating channel (aka Home Channel).

The EMNM Probe Monitor Response TLV may be added to the EasyMesh™ AP Metrics Response message.

The EMNM Agent may begin reporting the requested probe monitor information as soon as the AP Policy Config Request message was received to enable the feature and acknowledged to the EMNM controller by the EMNM Agent.

EMNM may support an EMNM Unassociated STA signal strength monitor information exchange.

Monitoring the signal strength between an AP and an unassociated STA is a feature that may be implemented by an EMNM Agent. The target is that the EMNM Agent may instruct the APs it manages to perform a signal strength monitor for one or more unassociated STAs during the scheduled scan windows and report a form of signal strength (e.g., RSSI or RCPI) for the STAs monitored. Reporting of the measurements may be performed through the EMNM defined reporting mechanism.

The EMNM Controller may configure the EMNM Agent with the list of STAs to monitor via the EMNM scan scheduling feature.

The EMNM Agent may insert an unsolicited WiFi EMNM Unassociated STA Monitor Response TLV in the AP Metrics Response message.

EMNM may support EMNM Radio Monitor information exchange.

Medium business assessment may be defined in WiFi EasyMesh™. However, medium business may be a broad definition that may consist of several contributing factors (e.g. OBSS, IBSS, TXOP, etc.). In light of interference deference, medium business assessment as defined in WiFi CERTIFIED EasyMesh™ when monitoring a radio may be optimized.

For EMNM solution, the content of the IBSS (own network traffic) and OBSS (overlapping BSS network traffic) needs to be correctly measured by the AP.

An EMNM Agent shall configure its underlying APs to perform the medium assessment by configuring a series of parameters (channel, channelwidth and monitor window duration). During radio assessment a series of data items may be measured and reported as defined in Table 9.

TABLE 9

| EMNM Radio Monitor parameters | |
|---|---|
| Parameter Name | Description |
| DURATION | Measurement time [ms] |
| RX IBSS | % time receiving frames from its own BSS |
| TX IBSS | % time transmitting frames in its own BSS |
| RX OBSS | % time receiving frames from another BSS |
| RX INTF | % time receiving corrupted frames (non-WLAN OBSS) |

As such, an access point may be required to assess a channel correctly and report it via the EMNM Agent to the EMNM Controller. Each access point may report IBSS (TX/RX) for all access points in the network to avoid incorrect assessment of OBSS when APs are operating on "shared" channels.

A required functionality may be that the access point may classify the parameter set with respect to a given list of target network node MAC addresses. The list of the MAC addresses may just be the list of active network APs, and this list may be modifiable during runtime based on the changes in the topology. The list may be able to hold a limited set of MAC addresses.

The EMNM Agent may use the WiFi EasyMesh™ Topology response messages received to populate this list of network nodes to be scanned.

The access point may report the traffic (IBSS) sent from and received by the given list of MAC addresses, separately. Any WLAN traffic that is not sent from/received by one of the MAC addresses in the list may be classified as OBSS. IBSS may correspond to the total duration (expressed in a percentage relative to the monitor window time) of frames with matching transmitter or receiver address (i.e. frames sent from or sent to the match MAC address). An important point is that, the management frames (e.g. IEEE 802.11 probe requests/responses) may be classified as OBSS, since classifying them as IBSS may make the channel seem better than it really is. Moreover, interference may correspond to non-WiFi traffic's duration during the observation period.

The percentages corresponding to the IBSS, OBSS and the interference may be reported.

The measurement duration as well as the target channel may be configured by the EMNM Controller through the EMNM Policy Config Request message.

If an EMNM Agent indicates that it supports "EMNM Periodic Scan Reporting" via the EMNM Feature Profile TLV, it may be configured by an EMNM Controller to include an unsolicited WiFi EasyMesh™ Channel Scan Result TLV with the WiFi EasyMesh™ AP Metrics Response message.

EMNM may support EMNM Advanced Metrics information exchange. EMNM may require additional data (additional to WiFi EasyMesh™) to be mined from the platforms/devices (network nodes) to perform steering or user experience analysis.

The extra "metrics" to be reported may comprise any/all of the following information: (1) device temperature: the sampled temperature of the device in degrees centigrade to be reported as an unsigned integer between 0 and 255. (2) device CPU load: the sampled CPU load of the device, all cores combined, to be reported as an unsigned integer between 0 and 255 with 0 being 0% load and 255 being 100% load. (3) device free memory: the sampled free memory count of the device to be reported as Kbyte via an unsigned integer. Free memory may be defined as the sum of memory that is available to a process, should a process request more memory (e.g. sum of free mem, cache). (4) AP idle time: the time (in ms) that a STA is idle (not transmitting or receiving data) when associated to an AP within the measurement interval.

The EMNM Agent may report the advanced metrics in a dedicated EMNM report/response TLV, "EMNM Advance Metrics Response" TLV. All metrics shall be reported as an extra TLV that may be sent along with the standard WiFi EasyMesh™ TLVs in the AP Metrics Response message.

EMNM may support Enhanced Network Management information exchange including EMNMDot11k Neighbor report information.

A client steering daemon may allow APs to answer an IEEE 802.11k neighbor report request from a STA. The answer however may have to be modified to match the steering daemon's roaming/steering strategy. As such, an EMNM Controller may configure an EMNM Agent with the correct response strategy.

An EMNM Agent may not reply with any of its APs to an IEEE 802.11k Neighbor report request until it has been configured by the EMNM Controller. An EMNM Agent may instruct its underlying APs not to advertise IEEE 802.11k RRM capabilities in its management frames until configuration has been received from the EMNM Controller.

Via the EMNM Controller's configuration policy, a client steering daemon/application may configure the EMNM Agents how to reply to STAs that seek neighbor info. The reply may be formatted by the steering daemon/application as matching with the steering policy that is used in the network. The EMNM Agent may be configured with the list of neighbor APs that it can populate in the IEEE 802.11k neighbor report response towards a single STA or a group of STAs.

The EMNM Controller may issue its IEEE 802.11k neighbor response configuration by means of response profiles. Each profile may contain information for a single STA as indicated by the target STA field, by providing a single MAC address, an OUI (to allow STA grouping), or a WILDCARD MAC address value (ff:ff:ff:ff:ff:ff) (to address all STAs).

An EMNM Agent that receives both SINGLE, GROUP or ALL profiles may use the exclusive or principle to address what policy it applies for a STA. Some examples of the exclusive or principle are shown as follows: IF SINGLE, then apply SINGLE, otherwise check GROUP; IF GROUP, then apply GROUP, otherwise check ALL; and IF ALL, then apply ALL.

Once configured, the EMNM Agent may instruct its APs to send replies that make use of the recently acquired configuration.

An EMNM Agent that received a new EMNM dot11k Neighbor Report Policy TLV may erase all prior configuration and apply the newly applied configuration. As such, the EMNM Controller may provide absolute configuration depending on the current state of the network instead of incremental configuration information.

EMNM may support EMNM Enhanced Association Control information exchange. A client steering daemon/application may require additional features to the WiFi EasyMesh™ association control request to be supported when such a request message is issued. The extensions may be defined for EMNM address limitations in the WiFi EasyMesh™ specification.

An AP managed by an EMNM Agent may be capable of the following features upon triggered by the EMNM Controller: (1) blocking access to a STA that is associated with the target AP (overrule standard WiFi EasyMesh™ association control request); (2) hiding the SSID string in the beacon of the target AP; (3) refraining from replying to an IEEE 802.11 association or reassociation request message; (4) refraining from replying to an IEEE 802.11 authentication request message; (5) refraining from replying to an IEEE 802.11 probe request (unicast) message.

All of these features may be configured in the EMNM Agent by the EMNM Controller via an EMNM specific policy configuration TLV, "EMNM Steering Policy" TLV.

If an EMNM Agent is configured to apply one or more of the EMNM enhanced association control features, it may apply them immediately.

When triggered to perform EasyMesh™ association control, an additional TLV, "EMNM Association Control Request" TLV, may be added by the EMNM controller to indicate that additional requirements need to be executed. The EMNM Association Control Request TLV may contain a bitfiag field that maps exactly to the enhanced association control features that were configured by the EMNM Controller. As such, the EMNM Controller may select what features to use for the enhanced association control mechanism.

EMNM may support EMNM Per STA priority control information exchange.

A managed mesh network may support prioritization of a STA within a WiFi Multimedia™ (WMM) queue. As such, the network may be configured to provide an end-to-end prioritization of STA's packet handling throughout the network as opposed to a per AP/device priority handling.

An access point's packet scheduler, responsible for the implementation of inter-packet priority, may be modified to handle prioritization of the recipient's MAC address wherever that device may be in the network.

To support per (destination) STA prioritization, an EMNM Controller may configure its EMNM Agents with a list of STAs and their respective relative priority with respect to each other. An underlying AP may always support the WMM priority mapping/handling and as such may ignore priority ranking when a lower ranked STA has traffic that is marked with a higher WMM class than a STA with a higher priority ranking.

Priority may be maintained over a backhaul connection, as such, a backhaul AP may apply the same priority scheduling as a fronthaul AP.

The EMNM Controller may issue its STA priority configuration by means of priority profiles. Each profile may contain information for a single STA as indicated by the target STA field, by providing a single MAC address. An OUI may be provided to allow STA grouping, a WILDCARD MAC address value (ff:ff:ff:ff:ff:ff) may be allowed to address all STAs.

An EMNM Agent that receives both SINGLE, GROUP or ALL profiles may use the exclusive or principle to address what policy it applies for a STA. Some examples of the exclusive or principle are shown as follows: IF SINGLE, then apply SINGLE, otherwise check GROUP; IF GROUP, then apply GROUP, otherwise check ALL; and IF ALL, then apply ALL.

To provision the STA priority, the EMNM Controller may start by looking at the EMNM Agent's priority granularity, aka the maximum level of priority steps that are supported. An EMNM Agent may report the maximum priority level via an EMNM TLV "Station Priority Policy". An EMNM Agent may insert the EMNM Station Priority Policy TLV in both WiFi EasyMesh™ 1905 AP-Autoconfiguration Search and AP Capability Report messages.

The EMNM Controller may assume that priority may increase or decrease with absolute integer steps of "1". The default priority for a STAs may be '0' which is the lowest priority. Higher integer numbers indicate a higher priority.

Once the priority granularity that is supported by the EMNM Agent is known to the EMNM Controller and the EMNM Controller has verified that the EMNM Agent supports per STA prioritization (reported via the EMNM Feature Profile TLV in the 1905 AP-Autoconfiguration Search and the AP Capability Response messages), the EMNM Controller may insert a Station Priority Policy TLV in the EasyMesh™ Multi-AP Policy Config Request message, to instruct the receiving EMNM Agent to modify the priority with which it handles egress packets for a configured STA on its fronthaul and backhaul APs.

The EMNM Station Priority Policy may contain a list of STA MAC addresses and their relative priority with respect to each other and the default priority (=0).

If an EMNM Agent receives an EMNM Station Prioritization message from the EMNM Controller, it may respond within a predetermined time period (for example, one second) with a 1905 Ack message. If the received Station Priority TLV exceeds the EMNM Agent's capabilities (e.g.

Priority level higher than max supported) then the EMNM Agent may insert an EMNM Error Report TLV in the Error Response message.

If an EMNM Agent correctly receives a Station Priority TLV, it may apply the content of the message immediately. EMNM Agents can be requested to "provision" priority support handling for STAs that have not or have not yet been connected to one of the APs managed by the EMNM Agent. This may not be reported as an error as this is a typical use case that an Agent may get provisioned by the Controller for operation.

Once applied, the AP may service the STAs in a round robin fashion (provided there are STA packets in the TX queue), starting with the highest priority number and ending with the lowest (=default) one.

If an EMNM Agent receives a new Station Priority TLV for a target (STA or group) for which it already received a prior Station Priority TLV, the most recent one may overrule the previous one.

EMNM may support an EMNM Tunneled Message.

EMNM may provide a mechanism to allow tunneling of IEEE 802.11 frames from an EMNM Controller to an EMNM Agent (and the other way around) to allow flexible deployment of vendor-specific and/or future WiFi application protocols. The tunneling may be performed via a specific "EMNM Tunneled message". The EMNM tunneled message may be based on the WiFi EasyMesh™ Tunneled message with the exception that it may use the EMNM Tunneled TLV instead of both the regular WiFi EasyMesh™ Tunneled TLV and the EMNM Tunneled TLV.

Message tunneling may be used in the following three scenarios: (1) relay STA frames from an EMNM Agent to an EMNM Controller; (2) Proxy the EMNM Controller's response via an EMNM (proxy) Agent to a STA; (3) Exchange a message between an EMNM Controller and an EMNM Agent.

For each of the above scenarios, the TLVs in the messages may be handled as defined in the respective feature definitions.

An EMNM Controller may configure an EMNM Agent to support any of the three defined scenarios if an EMNM Agent did announce support for it. For scenarios that no support has been announced, an EMNM Controller may not issue the configuration to turn on the feature.

EMNM may support an EMNM IEEE 802.11 WLAN frame relay.

An EMNM Agent may relay all IEEE 802.11 management and control frames that match a specific packet filter. This feature may be used in combination with the EMNM management frame IE tool to announce specific capabilities in IEEE 802.11 beacons.

As an example, an EMNM Controller may want to support a WiFi Easy Connect™ configurator. To avoid that an extender platform has to support WiFi Easy Connect™, the EMNM Controller may instruct its Agents to apply filters to relay specific IEEE 802.11 management and/or control frames to the EMNM Controller, which in turn may hand them over to the application residing on the platform on which the EMNM Controller operates. IEEE 802.11 FIG. 9-1 IEEE 802.11-2016, defines a MAC frame as illustrated in FIG. 9.

The frame type may be determined by the value of the "frame control" field, a 2-octet structure field that holds 2 bitfields, "Type" (2 bits) and "Subtype" (4 bits) as defined in IEEE 802.11-2016, section 9.2.4.1.1. The combination of those 2 bitfields allow to identify all IEEE 802.11 frames in a unique way, and the list of all available frame types and frame subtypes is available in IEEE 802.11-2016 table 9-1.

The frame type definition however is not specific enough to identify specific frames used in specific applications. WiFi Alliance, for example, uses public action frames for various purposes. EMNM applies a similar principle by employing EMNM specific public action frames to signal information in EasyMesh specific protocols.

As such, the packet relay filter configured in the EMNM Agent may also cover the "Action Frame Category" as defined in IEEE 802.11-2016, table 9-47, section 9.6 and the "Public Action Field Value" as defined in IEEE 802.11-2016, table 9-307, section 9.6.8.

Lastly, the packet relay filter may include an OUI field to match which vendor-specific public action frame is being issued. By example, WiFi Alliance uses '506F9A' to identify its vendor-specific frames. EMNM may define an OUI identifier that is specific to the integrator/device vendor implementing the system to allow unique identification of EMNM message extensions.

All filter fields defined may be configured via an EMNM specific TLV, "EMNM Frame Relay Policy". The TLV may accommodate the installation of frame relay filters. EMNMA configurable, finite number of filters may be used by an EMNM Agent.

An EMNM Controller may define which frames an EMNM Agent may forward by inserting an EMNM Frame Relay Policy TLV in the WiFi EasyMesh™ Multi-AP Policy Configuration Request message.

An EMNM Agent may insert an EMNM Error Report TLV in the Error Response message when the number of filter profiles exceeds the maximum allowed profiles which is typically a device-specific value as it relates for instance to HW implementation items such as available RAM.

An EMNM Agent may implement a filter function in the received frame buffer to verify if any of the incoming frames matches with any of the configured frame relay filters. In case there is a match, the EMNM Agent may insert the full MAC frame (header and body) into an EMNM Tunneled message by inserting an EMNM Tunneled TLV.

An EMNM AP may not process the frame type that it may relay based on the reception of a frame filter rule. This requirement avoids that the target frame is being processed locally by the management code of the recipient AP (e.g. hostapd) and by the EMNM Controller. If an IEEE 802.11 frame is to be relayed, the full handling of the frame may be left to the EMNM Controller.

The STA MAC for which a frame is relayed may be inserted in a WiFi EasyMesh™ Source Info TLV by the EMNM Agent and added to the EMNM Tunneled message.

The Tunneled Protocol Type value in the EMNM Tunneled message type TLV used for 802.11 WLAN frame relay actions may be identified by a unique ID byte field that uniquely identifies the content of a tunneled protocol inside an EMNM tunneled frame, as illustrated in Table 7.

If an EMNM Agent receives a new EMNM Frame Relay Policy TLV for a filter for which it already received a prior EMNM Frame Relay TLV, it may erase previous filters and apply the newly received information.

EMNM may support EMNM 802.11 WLAN proxied response message exchanges.

EMNM Tunneled messages defines a feature to tunnel (e.g. IEEE 802.11) messages between an EMNM Agent and an EMNM Controller.

If an EMNM Controller receives an EMNM Tunneled message, it may inspect it and digest all TLVs provided.

Upon reception of an EMNM Tunneled message, an EMNM Controller may reply with a new EMNM Tunneled message.

The IEEE 802.11 WLAN proxied response feature defined for the EMNM Tunneled message is for example employed by an EMNM Controller that replies to a relayed IEEE 802.11 message from a STA via one of its EMNM Agents.

To send a reply to a STA, the EMNM Controller may insert the target STA MAC address in the EMNM Destination Info TLV and the full MAC body (including a header) of the target frame in the EMNM Tunneled TLV when issuing a reply via an EMNM Tunneled message. An EMNM Controller may set the Tunneled Protocol Type value in the EMNM Tunneled Protocol Type TLV for example, but not limited to 0x00 or "generic", as illustrated in Table 7 for replies to relayed IEEE 802.11 frames by an EMNM Agent.

Once the TLV content has been determined, the EMNM Controller may send a proxied reply to the STA, via the EMNM Agent from which the EMNM Controller received the relayed IEEE 802.11 frame in the first place.

It should be noted that a STA does not have to be associated with the EMNM network. If an EMNM Agent is instructed to relay a public action frame, it can be instructed to relay a GAS frame for instance. These frames are sent by the STA in unassociated state.

If an EMNM Agent announced support for IEEE 802.11 WLAN proxied response messages and received an IEEE 802.11 WLAN proxied response from an EMNM Controller, it may immediately relay the response to the target STA.

It should be noted that prior to relaying the EMNM Controller's response, the EMNM Agent may determine via which access point the relayed message may be sent.

EMNM may support an EMNM Vendor-specific LAN protocol information exchange. EMNM Tunneled message may define a feature to tunnel messages between an EMNM Agent and an EMNM Controller.

For vendor-specific LAN protocols (not restricted to IEEE 802.11 PDUs), an EMNM Controller may also initiate communication with one of the EMNM Agents in the network, without having received an EMNM Tunneled message first.

If an EMNM Controller receives an EMNM Tunneled message, it may inspect it and digest all TLVs provided. Upon reception of an EMNM Tunneled message, an EMNM Controller may reply with a new EMNM Tunneled message.

An example of such a scenario is the one where an EMNM Controller may communicate with one of the EMNM Agents, without the intention that the EMNM Agent may forward or proxy frames to a STA. This type of communication may be intended to be used locally within the EMNM network (e.g. to establish a vendor-specific protocol between EMNM Agents).

In this scenario, the EMNM Controller may insert a unique identifier with which it uniquely identifies a specific EMNM Agent, for example but not limited to, the MAC address of the target EMNM Agent in the EMNM Destination Info TLV and the full MAC body (incl. MPDU header) of the target frame in the EMNM Tunneled TLV when issuing a reply via an EMNM Tunneled message.

It should be noted that there may be no strict requirement for the EMNM Tunneled TLV to carry an IEEE 802.11 MAC frame for this scenario. It may be possible to send virtually any payload type (e.g. json structures, text file, etc.). The payload type may be identified via the EMNM Tunneled Protocol Type indicator in the EMNM Tunneled message Type TLV. As such, the recipient of the EMNM Tunneled message is informed how to decode the message.

An EMNM Controller may set the Tunneled Protocol Type value in the EMNM Tunneled Protocol Type TLV to a unique ID, as illustrated in Table 11, to indicate which EMNM-specific protocol may be encapsulated within the EMNM Tunneled message.

If an EMNM Agent announced support for EMNM-specific LAN Protocol messages and received an EMNM-specific LAN Protocol message from an EMNM Controller, the EMNM Agent may decide to reply based on evaluation of the content of the EMNM Tunneled TLV.

TABLE 10

| Vendor-specific protocol IDs | | |
|---|---|---|
| EMNM Tunneled Protocol Type | Feature | Description |
| 0x00 | Generic frame | Unspecified tunneled protocol content, to be used as default value when the protocol is unknown or when relaying IEEE 802.11 frames |
| 0x01 | Protocol x | A first vendor-specific frame payload |

EMNM may support a variety of parental control features. One of the features may be a mechanism to disable the uplink (or upstream) and/or downlink (downstream) path to/from the internet for a STA.

A STA's ingress traffic may flow via the fronthaul AP to the backhaul AP/link. As such, if an EMNM Agent receives the target to break the upstream traffic flow, the IEEE 802.1Q bridge in the extender/gateway may be configured to drop all ingress frames with SA matching the station's MAC address (e.g. by modification of ebtables on a Linux platform).

A STA's egress traffic may flow via the fronthaul AP to the STA, or via the backhaul AP over the backhaul link to another fronthaul AP. As such, if an EMNM Agent receives the target to break the downstream traffic flow, the IEEE 802.1Q bridge in the extender/gateway may be configured to drop all egress frames with DA matching the STA's MAC address (e.g. by modification of ebtables on a Linux platform).

Once updated information has been received by the EMNM Agent, it may be applied immediately.

EMNM may support EMNM Configuration of IEs in IEEE 802.11 management frames.

To rapidly design and deploy new/proprietary protocols, manipulation of IEEE 802.11 information elements (denoted IE further in this application) in IEEE 802.11 management frames may be required.

An EMNM Controller may be capable of instructing an EMNM Agent to insert an EMNM—specific information element into a single or series of IEEE 802.11 management frames by inserting an EMNM Management Frame IE Policy TLV in the WiFi EasyMesh™ 1905 AP-Autoconfiguration response and Multi-AP Policy Config Request messages.

The EMNM Management Frame IE Policy TLV may contain all information required to allow the WLAN driver of an underlying AP to create the correct information element and insert it in the right IEEE 802.11 management frames.

Information elements are defined in IEEE 802.11-2016 IEEE 802.11-2016, section 9.4.2.1 as shown in FIG. 10.

IEEE 802.11-2016, table 9-77 defines a vendor-specific information element shall use an Element ID value equal to '221'. An AP may know that when an EMNM Agent requests to insert an IE, only a vendor-specific IE may be inserted. Other IEs are controlled by IEEE 802.11 protocols and may not be controlled by an EMNM Agent.

To identify that an EMNM-specific information element is advertised by a device, a sub-field structure may be implemented in the information field of the information element as defined in Table 12.

TABLE 12

EMNM Information Element structure
Information (variable)

| EMNM IE ID (3 octets) | Type (2 octets) | Information Element payload |
|---|---|---|

The EMNM IE ID field may, for example, use the OUI of the vendor to indicate that the information element is a vendor-specific information element.

The Type field may contain a 2-octet bitflag value to indicate which information is signaled via the information element. The bitflag value may be defined as illustrated in Table 13.

TABLE 13

EMNM Protocol information element structure

| Protocol/Feature | IE bitflag value | Description |
|---|---|---|
| EMNM Protocol x | 0x01 | Signal that an EMNM protocol "x" is being used |

The Information Element Payload field may contain a hexadecimal block of data. How it is structured is not relevant to the EMNM embodiments disclosed because EMNM is a management protocol and hence up to discretion of an implementer or vendor to define, related to the vendor-specific protocol that is being signaled.

The full "information" data block (EMNM IE ID, Type and Information Element payload) may be provided by the EMNM Agent via the EMNM Controller as a single hexadecimal block containing the aggregate of all subfields defined.

It should be noted that the definition of the EMNM Information Element structure for an EMNM vendor-specific information element may be informative for the EMNM definition as the payload definition remains within the EMNM Agent and Controller.

An EMNM Controller may insert the target information element, or series of elements together with a bitflag that identifies in which management frame an information element may be inserted.

The IEEE 802.11 management frame type may be defined via a byte field, as illustrated for example in Table 14.

TABLE 14

EMNM Management frame types indicator

| Management frame type | Bitflag value |
|---|---|
| Beacon | 0x01 |
| Association/Reassociation Response | 0x02 |
| Authentication Response | 0x03 |

TABLE 14-continued

EMNM Management frame types indicator

| Management frame type | Bitflag value |
|---|---|
| Probe Response | 0x04 |
| Action Frame | 0x05 |
| Probe Request | 0x06 |
| Association/Reassociation Request | 0x07 |

If an EMNM Agent that is capable of supporting EMNM Management Frame IE policies receives a new EMNM Management Frame IE Policy TLV, it may remove EMNM Management Frame IE policies and apply the new policy.

EMNM may support an EMNM Error Report information exchange.

EMNM Agents may have the ability to report that issues are encountered during operation of the network. A typical use case for error reporting may be an EMNM Agent that reacts to a configuration (change) request from the EMNM Controller which may be not supported by the EMNM Agent.

An EMNM Agent may insert additional information in the format of an EMNM TLV to a WiFi EasyMesh™ profile-2 Error report message.

An EMNM Agent may not insert an EMNM Error Report TLV in a Profile-2 Error Response message when it has not advertised support for EMNM error reporting in the EMNM Feature Profile TLV in the 1905 AP-Autoconfiguration Search and AP Capability Response messages.

If an EMNM Agent identifies multiple errors, an EMNM Error Report TLV may be sent per error detected. The EMNM Error Report TLV may contain the same MID that was received in the Multi-AP Config Request message.

The format of the error report may be identified by means of a byte field, as illustrated for example in Table 15.

TABLE 15

EMNM Error Code table

| Error bitflag value | description |
|---|---|
| 0x01 | error 1 |
| 0x02 | error 2 |
| 0x03 | Custom error 1 |
| 0x04 | Custom error 2 |

An EMNM (WLAN) Messaging Protocol is disclosed herein. WiFi EasyMesh™ defines "higher layer data payload over 1905" to allow 1905.1 high-level entities (HLEs) to communicate with each other using vendor-specific or HLE-specific protocols.

EMNM specific LAN protocols (not restricted to IEEE 802.11 PDUs) may be implemented by using EM Higher Layer Data Payload messages.

The vendor-specific protocol is to be embedded in the EM Higher Layer Data TLV. The Higher layer protocol indicator in the TLV is set to 0x02 to indicate that a proprietary protocol is carried over the Higher Layer Data message.

The first 6 octets of the payload may indicate that the payload type links with an EMNM protocol by using an OUI, e.g., "8841FC". The next 2 octets may indicate the EMNM protocol that is carried in the payload of the EM Higher Layer Data TLV's payload section. The remainder (maximum CMDU payload length— 8 octets) of the TLV's payload is allocated to the EMNM protocol payload.

An example of an inter HLE communication scenario is one where an EMNM Controller only communicates with one of the EMNM Agents, without the intention that the EMNM Agent forwards or proxies frames to a STA. This type of communication is intended to be used locally within the EMNM network (e.g. to establish an EMNM specific protocol between EMNM Agents and the EMNM Controller).

It is possible to send virtually any payload type (e.g. json structures, text file . . . ). The payload type is identified via the EMNM Protocol indicator in the EM Higher Layer Data TLV. As such, the recipient of the Higher Layer Data message is informed how to decode the message.

An EMNM entity may set the EMNM Protocol value in the EM Higher Layer Data TLV to a value defined in Table 16 to indicate which EMNM specific protocol is encapsulated within the message.

An EMNM Controller may first inspect an EMNM Agent's announced capability to support EMNM specific (W)LAN messaging protocol by inspecting the EMNM Feature Profile TLV, before sending an EM higher layer data message. In case an EMNM Agent does not support both of these features, an EMNM Controller may not issue an EM higher layer data message.

An EMNM Agent cannot detect that an EMNM Controller supports EMNM protocol messages being tunneled over EM higher layer data messages. As such, since EM higher layer data messages are a mandatory EM feature, the EMNM Agent may send the higher layer data message, which it indicates supporting for, irrespective of the EMNM Controller's capability to decode the message. An EMNM Controller that does not "understand" the content of the EM higher layer data TLV may drop it rather than forwarding it to its upper application layer.

If an EMNM Controller received an EMNM specific (W)LAN Protocol message from an EMNM Agent, it may decide to reply based on evaluation of the content of the EMNM protocol and value.

An EMNM Controller that does not "understand" the content of the EM higher layer data TLV may drop it if it has not announced support for this feature.

If an EMNM Agent announced support for EMNM specific (W)LAN messaging protocol messages and received an EMNM specific (W)LAN Protocol message from an EMNM Controller, may decide to reply based on evaluation of the content of the EMNM protocol and value.

TABLE 16

| EMNM Protocol Type | Feature | Description |
| --- | --- | --- |
| 0x0000 | Generic frame | Unspecified EMNM protocol content, to be used as default value when the protocol is unknown |
| 0x0001 | EMNM event channel | json-structured event message from one of the devices in the network |

EMNM may support an EMNM triggered reboot, reset or factory-reset of a device. Managing a network requires tools to allow reboot or reset of devices. Applications that manage the network's health or software version may want to resort to either rebooting an extender or even go as far as resetting it to the configured state or even all the way to the factory state.

While reboot is clear, reset and reset-to-factory defaults are principles that require attention. The difference between both is that a reset will trigger an EMNM Agent to trigger the device it manages to reset all its configuration to that which has been persistently stored, with exception of the information related to backhaul infrastructure such as the SSID, security credentials (b.STA and b.AP) and the DPP configurator's c-sign key (if any). Resetting a device will allow the multi-AP network infrastructure to be maintained. When a factory reset is performed, the device is restored to the defaults that are embedded in the flash image of the software.

The EMNM Controller may be triggered from the vendor application layer to instruct an EMNM Agent that has previously announced capability for the EMNM reboot/reset feature (via the EMNM Feature Profile TLV) to trigger the device it manages to perform the reboot or reset.

The EMNM Controller may issue a vendor-specific 1905 message "EMNM Reboot Request" towards an EMNM Agent (unicast) to achieve the reboot/reset feature. An EMNM Controller inserts an EMNM Reboot Request TLV in the EMNM Reboot Request message to indicate if a reboot/reset or factory-reset is required.

If an EMNM Agent announced support for the EMNM triggered reboot/reset feature, it may respond with a 1905 ACK within a predetermined time (for example, 1 second) of receiving the EMNM Reboot Request and then apply the requested action immediately. If no support was announced, the EMNM Reboot Request message shall be discarded by the EM or EMNM Agent.

The EMNM Reboot TLV contains 2 values: Action: defined as single octet whereby reboot=0 and reset=1, and Factory Reset: defined as a Boolean (single octet) whereby reset=0 and factory-reset=1. The factory reset parameter is linked with the value of the reboot parameter as only a factory-reset can be requested if the message already requests a reset (Action value=1).

EMNM Coordinated Software Update

Vendor may implement a feature to update the software deployed on device in the network in an automated, controlled and coordinated way via the EMNM Controller. The EMNM Controller itself may be managed by the vendor application layer (e.g. Live Update Server) to allow handling of software updates.

The EMNM Controller may report the software and hardware implementation version of a device or devices (collected via EasyMesh™ onboarding and the EMNM Device Information TLV) to the application layer, as well as a device's capability to support EMNM Coordinated Software update feature.

The EMNM Controller (via the vendor application stack) may not attempt to update the device software for devices for which their EM or EMNM Agent does not report supporting the EMNM Coordinated Software feature via the EMNM Feature Profile TLV. For these devices, the fall-back method may be the one indicated by the device manufacturer or operator SW maintenance system.

EM or EMNM Agents that may receive software download/write triggers from an EMNM Controller without having announced support for the EMNM Coordinated Software update feature may discard these messages.

To allow an EMNM Controller to coordinate the SW update process of a device, four EasyMesh™ message types (with matching TLV's) are defined that must be supported by the EMNM Controller and EMNM Agent.

First, an EMNM Download Software message is defined. This is a Unicast message: EMNM Controller to EMNM Agent. It instructs the EMNM Agent to download a software image via a secure URL that is provided via the EMNM Download Software TLV included in the message. It provides the EMNM Agent with a software download timeout (default=120s) to evaluate if a download can be executed or not (e.g. invalid URL). EMNM Agents may reply to an EMNM Controller with a 1905 ACK within a predetermined time period (for example, 1 second) after reception of the message. An EMNM Agent may be instructed to download a software image multiple times or download a software image and never write it to flash, so that after a while a new download request is issued for a new software image. An EMNM Agent hence may overwrite any previously downloaded image with a new one if a download request is received/processed. A downloaded software image may be stored in RAM and hence not be reboot persistent.

Second, an EMNM Download Status message is defined. This is a unicast message: EMNM Agent to EMNM Controller. It provides the download status (Boolean success/fail). It provides evidence that an EMNM Agent has downloaded the software image via an MD5 checksum of the downloaded image in the EMNM Download Complete TLV or a failure indication (up to 32 characters). An EMNM Controller may reply to an EMNM Agent's EMNM Download Status message with a 1905 ACK within a predetermined time period (for example, 1 second) after reception of the message. EMNM Agents may attempt to download a SW image within the download timeout window provided by the EMNM Controller. If a download fails to complete within the download window and EMNM may check if a download has started or not. If a download has started, the download window may be expanded up to three times the configured download window. If no download has started when the download timeout expires, the download status is failed. If an EMNM Agent determined that the signature of the download software image is invalid it may send an error indicator next to the status indicator. The Error indicator is defined as a 1-octet value, a value of 0 is reserved. A value of 1 indicates not matching signature. The other values (2aF) are reserved. An EMNM Agent may not retry a failed download; this is up to the application controlling and the EMNM Controller to determine.

Third, an EMNM Write Software message is defined. This message is a relayed multicast message: EMNM Controller to EMNM Agent, relayed to other EMNM Agents. It instructs all EMNM Agents to write the recently downloaded software image from RAM to flash memory. Upon reception, an EMNM Agent shall immediately start writing the image and once the task completed, send an EMNM Write Status message to indicate completion of the task.

Fourth, an EMNM Write Status message is defined. It is a unicast message: EMNM Agent to EMNM Controller. It provides the write status (Boolean success/fail). An EMNM Controller may reply to an EMNM Agent's EMNM Write Status message with a 1905 ACK within a predetermined time period (for example, 1 second) after reception of the message. Once a firmware has been written, the EMNM Agent may reboot the platform (e.g., access point, gateway, extender).

EMNM supports a WiFi 6 Capabilities information exchange. WiFi EasyMesh™ already includes basic support for a network to convey 802.11ax (HE) capabilities. The AP may include an AP HE Capabilities TLV in the EasyMesh AP Capability Report message and a STA's capabilities can be derived from (re)association request frame body in the Client Capability Report TLV in the EasyMesh Client Capability Report message.

With the introduction of WiFi 6 certification however, extra capabilities have been identified as relevant to profile the capabilities of a WiFi 6 AP and or STA.

To capture these additional capabilities, EasyMesh draft release 3 (R3) includes new capability announcements for a WiFi 6 AP and an associated WiFi 6 STA.

An AP WiFi 6 Capabilities TLV may be included with the AP Capability Report message as defined in EasyMesh draft R3, section 17.1.7 and section 17.2.72.

An Associated WiFi 6 STA Status Report TLV is to be included with the AP Metrics Response Message as defined in EasyMesh draft R3, section 17.1.17 and section 17.2.73.

An EMNM Agent and EMNM Controller may support the EasyMesh draft R3 WiFi 6 capability extensions.

An EMNM Agent may indicate that it supports reporting enhanced WiFi 6 capabilities for an AP or WiFi 6 status for a STA by announcing the EMNM Agent capabilities, advertised via the EMNM Feature Profile TLV in the 1905 AP-Autoconfiguration Search and AP Capability Report messages.

EMNM includes a process for device pre-provisioning (DPP) backhaul STA and EMNM agent onboarding. A Vendor may support zero touch onboarding by leveraging the WiFi Easy Connect™ onboarding procedure. Easy Connect or Device Pre-Provisioning, DPP in short, is a protocol that enables an EMNM Agent to onboard into an EMNM network using an EMNM Controller that implements a DPP configurator.

The onboarding may occur over Ethernet or over WiFi via another EMNM Agent acting as a Proxy Agent to relay DPP messages back and forth between the EMNM Controller and the onboarding EMNM Agent.

The DPP onboarding process begins when the EMNM Controller receives the EMNM bootstrapping information of the Enrollee EMNM Agent in the form of a DPP URI. A vendor URI may be received either via the cloud, directly inserted into the data model of EMNM Controller, or it may be communicated via the (W)LAN network to the EMNM Controller via an out-of-band communication mechanism (a similar network socket that is opened as if configuration of the URI was achieved via the cloud) by using a smartphone application that captures the QR code of an EMNM Agent that is to be onboarded.

Upon receipt of the DPP URI, the EMNM Controller may instruct the EMNM Agents present in the network to advertise the Configurator Connectivity Element (CCE) IE in their beacon and probe response frames and listen for the onboarding EMNM Agent's (Enrollee) chirp message.

Once the EMNM Controller receives a Presence Announcement from an onboarding EMNM Agent, it initiates the DPP Authentication procedure by generating a DPP Authentication Request message. The EMNM Agents present in the network relay the DPP Authentication messages received from the EMNM Controller to the onboarding EMNM Agent when the chirp with the correct hash is received from the Enrollee.

Upon successful authentication, the onboarding EMNM Agent requests network configuration information from the EMNM Controller (configurator) by exchanging DPP Configuration Protocol messages with the Multi-AP Controller.

EMNM Agent and EMNM Controller may support the DPP onboarding protocol defined in EasyMesh™ draft release 3 and as such behave as a profile-3 device where the current EMNM version serves as draft profile-3 indicator.

EMNM Agents and an EMNM Controller may support an onboarding method via WiFi with out-of-band DPP bootstrapping as defined in EasyMesh draft R3.

An EMNM Agent may prefer an Ethernet connection over a WiFi connection when onboarding. If an Ethernet connection is available, the EMNM Agent may first try to onboard via that interface and exhaust its onboarding attempts before enabling a B.STA and trying to onboard via WiFi.

An EMNM Agent may indicate that it supports DPP EMNM Agent onboarding by announcing the EMNM Agent capabilities, advertised via the EMNM Feature Profile TLV in the 1905 AP-Autoconfiguration Search and AP Capability Report messages.

DPP or Easy Connect™ onboarding in EasyMesh™ requires a different system architecture as is typically used/encountered in WiFi Easy Connect™. The reason is the multi-hop nature of an EasyMesh™ network. As such, the EMNM Agents may have to fulfil several different roles that differ per device role in the network.

WiFi EasyMesh™ draft release 3, defines 2 Agent roles. A Proxy Agen role where a Multi-AP Agent that translates between 1905 CMDUs and 802.11 frames to/from an Enrollee Multi-AP Agent is defined. And an Enrollee Agent where a Multi-AP Agent that is seeking to be or is in the process of being DPP onboarded to the Multi-AP network is defined.

Table 17 outlines what role an EMNM Agent may support based on the role the device has (in the multi-AP network) on which the EMNM Agent operates. EMNM Agents embedded in a Broadband Gateway don't need to support a DPP-Enrollee function as they onboard automatically as they are explicitly trusted by the EMNM Controller that is embedded in the same physical device. Hence EMNM Agents embedded in a Broadband Gateway shall only implement the proxy Agent functionality, whereas extenders shall support all roles.

TABLE 17

EMNM Agent DPP role versus Device Role

| Network Device Role | Proxy Agent | Enrollee Agent |
|---|---|---|
| Gateway | x | |
| Extender | x | x |

An EMNM Agent that is co-located with an EMNM Controller, as is, for example, the case for a broadband GW, may not perform DPP onboarding. Co-located Agents may leverage the co-location aspect to have an explicit trust relationship with the EMNM Controller and thus do not require authentication. These Agents onboard over a logical Ethernet connection and don't need DPP or WSC-PBC to be provisioned. As a consequence, EMNM Agents that are co-located with an EMNM Controller may not implement DPP reconfiguration (which would imply that they have completed DPP onboarding a priori) but may be able to proxy the messages to the configurator EMNM Controller.

EMNM supports EMNM extender event log triggers. Vendor extenders may support various logging mechanisms that may evolve over time. In a first phase, they may upload platform (e.g. kernel, WiFi driver, SW application stack . . . ) events to a dedicated syslog/Logstash server.

Regardless of the actual logging mechanism used, an EMNM Agent may be triggered by an EMNM Controller to start uploading debug traces/messages to a preconfigured log collection mechanism. This may be done to prevent uploading a large quantity of data when not needed as debug information is typically consumed in an ad-hoc way. Usually, debug information consists of a large collection of traces/messages due to the low trace level that is typically set to allow capturing the most amount of information for debugging purposes.

An EMNM Controller may trigger an EMNM Agent by issuing an EMNM Debug Info Trigger message, containing an EMNM Debug Info TLV to instruct an EMNM Agent to start sending debug traces/messages to a preconfigured debug trace/message collection system.

The EMNM Debug Info TLV contains an enable/disable field, implemented as a bitflag and a log level value implemented as an unsigned integer value between 0 and 10 with 0 being the highest and 10 being the lowest log level.

An EMNM Agent may indicate that it supports being triggered to upload debug traces for an Extender by announcing the EMNM Agent capabilities, advertised via the EMNM Feature Profile TLV in the 1905 AP-Autoconfiguration Search and AP Capability Report messages.

An EMNM Agent that support the EMNM extender event log trigger feature may reply within a predetermined time period (for example, 1 second) after the reception of an EMNM Debug Info Trigger message with a 1905 ACK. Other EM Agents or EMNM Agents that don't support the feature may drop the message.

EMNM Message utilize TLV structures. As explained, EMNM may employ both IEEE 1905.1 message and TLV extensions. Below are messages and accompanying TLVs that may be used by the EMNM as addition to WiFi EasyMesh™. A pure EMNM message may carry the prefix "EMNM" in the title of the message. The same principle applies for illustrated TLV extensions.

The following paragraphs define EMNM Messages and what they may contain.

EMNM Measurement Report Query. The following TLVs may be included in this message: one or more EMNM Measurement Report Query TLV.

EMNM Tunneled message. The following TLVs may be included in this message: (1) one Source Info TLV (see section WFA CERTIFIED EasyMesh™ Release 2, section 17.2.54) (*); (2) one EMNM Destination Info TLVs (*); (3) EMNM Tunneled Protocol type TLV; and (4) one or more Tunneled TLVs. It should be noted that (*) means that there is either a Source Info TLV or a Destination Info TLV, not both.

1905 AP-Autoconfiguration Search. The following TLVs may also be included in this message, in addition to TLVs listed in WFA CERTIFIED EasyMesh™ Release 2: one EMNM Feature Profile TLV.

1905 AP-Autoconfiguration Response. The following TLVs may also be included in this message, in addition to TLVs listed in WFA CERTIFIED EasyMesh™ Release 2: one EMNM Management Frame IE Policy TLV.

AP Capability Report message format. The following TLVs may be included in this message, in addition to TLVs listed in WFA CERTIFIED EasyMesh™ Release 2: one EMNM Feature Profile TLV.

Multi-AP Policy Config Request message format. The following TLVs may be included in this message, in addition to TLVs listed in WFA CERTIFIED EasyMesh™ Release 2: (1) Zero or one EMNM Steering Policy TLV; (2) Zero or one EMNM Metric Reporting Policy TLV; (3) Zero or one EMNM dot11k Neighbor Report Policy TLV; (4) Zero or one EMNM Radio Monitor Policy; (5) Zero or one EMNM Traffic Policy TLV; (6) Zero or one EMNM Station Priority Policy TLV; (7) Zero or one EMNM Frame Relay Policy TLV; and (8) Zero or one EMNM Management Frame IE Policy.

AP Metrics Response message format. The following TLVs may be included in this message, in addition to TLVs listed in WFA CERTIFIED EasyMesh™ Release 2: (1) Zero or one EMNM Advanced Metrics Response TLV; (2) Zero or one EMNM Probe Monitor Response TLV; (3) Zero or one EMNM Unassociated STA Monitor Response TLV; (4) Zero or one EMNM Radio Monitor Response TLV; (5) Zero or one EMNM Device Metrics TLV; (6) Zero or more EMNM Ethernet Host Stats TLVs; (7) Zero or more Associated WiFi 6 STA Status Report TLVs.

Client Association Control Request message format. The following TLVs may be included in this message, in addition to TLVs listed in WFA CERTIFIED EasyMesh™ Release 2: one or more EMNM Association Control Request TLVs.

Error response message format. The following TLVs may be included in this message, in addition to TLVs listed in WFA CERTIFIED EasyMesh™ Release 2: one or more EMNM Error Report TLV.

EMNM Reboot Request message. The following TLVs may be included in this message: One EMNM Message Type TLV, and one EMNM Reboot Request TLV.

EMNM Download SW image message. The following TLVs may be included in this message: One EMNM Message Type TLV, and one EMNM Download SW image TLV.

EMNM Download Status message. The following TLVs may be included in this message: One EMNM Message Type TLV, and one EMNM Download Status TLV.

EMNM Write SW image message. The following TLVs may be included in this message: One EMNM Message Type TLV, and one EMNM Write SW image TLV.

EMNM Write Status message. The following TLVs may be included in this message: One EMNM Message Type TLV, and one EMNM Write Status TLV.

EMNM Debug Info Trigger message. The following TLVs may be included in this message: One EMNM Debug Info Trigger TLV.

Listed below are the TLVS that may be used by EMNM.

The EMNM Feature Profile TLV is shown below in Table 18.

TABLE 18

| EMNM Feature Profile TLV | | | |
|---|---|---|---|
| Field | Length | Value | Description |
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor OUI |
| | 1 octet | 0x01 | EMNM Feature Profile TLV |
| | 4 octets | Variable | EMNM Agent version |
| | 2 octets | k (>=0) | Number of EMNM features announced |
| | 4 octets | Variable | EMNM feature as defined in Table 2 |
| | The above field is repeated k − 1 times, except when k equals '0'. In this case the last field is omitted | | |

The EMNM Metric Reporting Policy TLV is shown below in Table 19.

TABLE 19

| EMNM Metric Reporting Policy TLV | | | |
|---|---|---|---|
| Field | Length | Value | Description |
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor OUI |
| | 1 octet | 0x02 | EMNM Metric Reporting Policy TLV |
| | 1 octet | k (>0) | Number of radios. |
| | 6 octets | Variable | Radio Unique Identifier. |
| | bit 7 | 0: Do not include EMNM Probe Monitor Response TLV with AP Metrics Response 1: Include EMNM Probe Monitor Response TLV with AP Metrics Response | Inclusion Policy with AP Metrics Response for the Probe Monitor Response TLV |
| | bit 6 | 0: Do not include EMNM Unassociated STAMonitor Response TLV with AP Metrics Response 1: Include EMNM Unassociated STAMonitor Response TLV with AP Metrics Response | Inclusion Policy with AP Metrics Response for the Unassociated STA Monitor Response TLV |
| | bit 5 | 0: Do not include EMNM Radio Monitor Response TLV with AP Metrics Response 1: Include EMNM Radio Monitor Response TLV with AP Metrics Response | Inclusion Policy with AP Metrics Response for the Radio Monitor Response TLV |

TABLE 19-continued

| | | EMNM Metric Reporting Policy TLV | |
|---|---|---|---|
| Field | Length | Value | Description |
| | bit 4 | 0: Do not include EMNM Advanced Metrics Response TLV with AP Metrics Response 1:EMNM Advanced Metrics Response TLV with AP Metrics Response | Inclusion Policy with AP Metrics Response for the Advanced Metrics Response TLV |
| | bit 3 | 0: Do not send a Channel Scan Report Message when an EMNM Radio Monitor Response TLV is sent 1: Send a Channel ScanReport Message when an EMNMRadio Monitor Response TLV is sent | Policy to trigger a periodical and unsolicited EasyMesh ™ Channel Scan Report message when an EMNM Radio Monitor Response TLV is sent |
| | bits 2-0 | Reserved | |
| | The above 8 fields are repeated k – 1 times. | | |

The EMNM Advanced Metrics Response TLV is described below in Table 20.

TABLE 20

| | | EMNM Advanced Metrics Response TLV | |
|---|---|---|---|
| Field | Length | Value | Description |
| tlvType | 1 octet | 0x11 | Vendor specific TLV |
| tlvLength | 2 octets | Variable | Number of octets in ensuing tlvValue field. |
| tlvValue | 3 octets | 8841fc | Vendor OUI |
| | 1 octet | 0x03 | EMNM Advanced Metrics Response TLV |
| | 1 octet | 0-255 | CPU load of the platform, reported as an unsigned integer where 255 equals 100% |
| | 1 octet | 0-200 201-255: reserved | Platform temperature, reported as degrees centigrade as unsigned integer values |
| | 8 octet | Variable | Platform free memory, byte count, reported as unsigned integer |
| | 1 octet | m (>=0) | The number of Radios that report the Advanced Metrics |
| | 6 octets | Variable | Radio Unique Identifier. |
| | 1 octet | k (>=0) | The number of STA entries included in this TLV. |
| | 6 octets | Any EUI-48 value | MAC address of STA for which idle time is being reported. |
| | 4 octets | Variable | idle time in ms that a STA is not sending or receiving traffic |
| | The above 7 fields are repeated (m – 1) (k – 1) times (if m = 0, k = 0, these fields are omitted). | | |

The EMNM Probe Monitor Response TLV is described below in Table 21.

TABLE 21

| | | EMNM Probe Monitor Response TLV | |
|---|---|---|---|
| Field | Length | Value | Description |
| tlvType | 1 octet | 0x11 | Vendor specific TLV |
| tlvLength | 2 octets | Variable | Number of octets in ensuing tlvValue field. |
| tlvValue | 3 octets | 0x8841fc | Vendor OUI |
| | 1 octet | 0x04 | EMNM Probe Monitor Response TLV |

TABLE 21-continued

| Field | Length | Value | Description |
|---|---|---|---|
| | 1 octet | m (>=0) | The number of RADIO entries that report the probe monitor |
| | 6 octets | Variable | Radio Unique Identifier. |
| | 1 octet | k (>=0) | The number of STA entries included in this TLV. |
| | 6 octets | Any EUI-48 value | MAC address of STA for which UL RCPI is being reported. |
| | 4 octets | Variable | The time delta in ms between the time at which the RSSI for STA was measured, and the time at which this report was sent. |
| | 1 octet | Variable 0-220 (RSSI is encoded per Table 9-154 of IEEE 802.11-2016). Reserved: 221-255. | Probe request RSSI for STA |

The above 5 fields are repeated (m − 1) (k − 1) times (if m = 0, or k = 0, these fields are omitted).

The EMNM Unassociated STA Monitor Response TLV is described below in Table 22.

TABLE 22

| Field | Length | Value | Description |
|---|---|---|---|
| tlvType | 1 octet | 0x11 | Vendor specific TLV |
| tlvLength | 2 octets | Variable | Number of octets in ensuing tlvValue field. |
| tlvValue | 3 octets | 8841fc | Vendor OUI |
| | 1 octet | 0x05 | EMNM Unassociated STA Monitor Response TLV |
| | 1 octet | m (>=0) | The number of RADIO entries that report the unassociated STA monitor |
| | 6 octets | Variable | Radio Unique Identifier. |
| | 1 octet | k (>=0) | The number of STA entries included in this TLV. |
| | 6 octets | Any EUI-48 value | MAC address of STA for which UL RSSI is being reported. |
| | 1 octet | Variable | A single channel number on which the RSSI measurement for STA was made. |
| | 4 octets | Variable | The time delta in ms between the time at which the RSSI for STA was measured, and the time at which this report was sent. |
| | 1 octet | Variable 0-220 (RSSI is encoded per Table 9-154 of IEEE 802.11-2016). 221-255: Reserved. | Uplink RCPI for STA. |

The above 7 fields are repeated (m − 1) (k − 1) times (if m = 0, or k = 0, these fields are omitted).

The EMNM Steering Policy TLV is described below in Table 23.

TABLE 23

| Field | Length | Value | Description |
|---|---|---|---|
| tlvType | 1 octet | 0x11 | Vendor specific TLV |
| tlvLength | 2 octets | Variable | Number of octets in ensuing tlvValue field. |
| tlvValue | 3 octets | 8841fc | Vendor OUI |
| | 1 octet | 0x06 | EMNM Steering Policy TLV |
| | bit 7 | 0: do not activate SSID hiding feature | When using the Client Association Control Mechanism, the AP of the agent receiving the request message shall issue a blank SSID string |

TABLE 23-continued

| | | EMNM Steering Policy TLV | |
|---|---|---|---|
| Field | Length | Value | Description |
| | | 1: activate SSID hiding feature | in its beacon until recalled by the controller. |
| | bit 6 | 0: do not respond to 802.11 PROBE REQ frames from a target STA 1: respond to 802.11 PROBE REQ frames from a target STA | When using the Client Association Control Mechanism, the AP of the agent receiving the request message shall refrain from answering the target STA's PROBE REQ messages |
| | bit 5 | 0: do not respond to 802.11 ASSOC/ REASSOC REQ frames from a target STA 1: respond to 802.11 ASSOC REQ frames from a target STA | When using the Client Association Control Mechanism, the AP of the agent receiving the request message shall refrain from answering the target STA's ASSOC/REASSOC REQ messages |
| | bit 4 | 0: do not respond to 802.11 AUTH REQ frames from a target STA 1: do not respond to 802.11 AUTH REQ frames from a target STA | When using the Client Association Control Mechanism, the AP of the agent receiving the request message shall refrain from answering the target STA's AUTH REQ messages |
| | bit 3 | 0: do not blacklist an associated STA 1: blacklist an associated STA | When using the Client Association Control Mechanism, the AP of the agent receiving the request message shall deny access to an associated target STA |
| | bit 2-1 | reserved | |

The EMNM Association Control Request TLV is described below in Table 24.

TABLE 24

| | | EMNM: Association Control Request TLV | |
|---|---|---|---|
| Field | Length | Value | Description |
| tlvType | 1 octet | 0x11 | Vendor specific TLV |
| tlvLength | 2 octets | Variable | Number of octets in ensuing tlvValue field. |
| tlvValue | 3 octets | 8841fc | Vendor OUI |
| | 1 octet | 0x07 | EMNM Association Control Request TLV |
| | 6 octets | Any EUI-48 value | BSSID-unique identifier of the BSS for which the client blocking request applies. |
| | 1 octet | 0x00: Block 0x01: Unblock 0x02-0xFF: Reserved | Association Control. Indicates if the request is to block or unblock the indicated STAs from associating. |
| | 2 octets | Variable | Validity Period. Time period in seconds (from reception of the Client Association Control Request message) for which a blocking request is valid. |
| | 1 octet | k (>0) | STA List Count Indicating one or more STA(s) for which Client Association Control request applies. |
| | 6 octets | Any EUI-48 value | STA MAC address for which the Client Association Control request applies. |
| | bit 7 | 0: do not activate SSID hiding feature 1: activate SSID hiding feature | When using the Client Association Control Mechanism, the AP of the agent receiving the request message shall issue a blank SSID string in its beacon until recalled by the controller. |
| | bit 6 | 0: do not respond to 802.11 PROBE REQ frames from a target STA 1: respond to 802.11 PROBE | When using the Client Association Control Mechanism, the AP of the agent receiving the request message shall refrain from answering the target STA's PROBE REQ messages |

TABLE 24-continued

| Field | Length | Value | Description |
|-------|--------|-------|-------------|
| | | REQ frames from a target STA | |
| | bit 5 | 0: do not respond to 802.11 ASSOC/ REASSOC REQ frames from a target STA 1: respond to 802.11 ASSOC REQ frames from a target STA | When using the Client Association Control Mechanism, the AP of the agent receiving the request message shall refrain from answering the target STA's ASSOC/REASSOC REQ messages |
| | bit 4 | 0: do not respond to 802.11 AUTH REQ frames from a target STA 1: do not respond to 802.11 AUTH REQ frames from a target STA | When using the Client Association Control Mechanism, the AP of the agent receiving the request message shall refrain from answering the target STA's AUTH REQ messages |
| | bit 3 | 0: do not blacklist an associated STA 1: blacklist an associated STA | When using the Client Association Control Mechanism, the AP of the agent receiving the request message shall deny access to an associated target STA |
| | bit 2-0 | reserved | |
| | The above 7 fields are repeated k − 1 times. | | |

The EMNM dot11k Neighbor Report Policy TLV is described below in Table 25.

TABLE 25

EMNM dot11k Neighbor Report Policy

| Field | Length | Value | Description |
|-------|--------|-------|-------------|
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor OUI |
| | 1 octet | 0x08 | EMNM Metric Reporting Policy TLV |
| | 1 octet | m (>0) | Number of neighbor response profiles |
| | 6 octets | Variable | Target STA MAC (single, OUI or WILDCARD) |
| | 1 octet | k (>0) | Number of radios. |
| | 6 octets | Variable | Radio Unique Identifier (BSSID) |

TABLE 25-continued

EMNM dot11k Neighbor Report Policy

| Field | Length | Value | Description |
|-------|--------|-------|-------------|
| | 1 octet | Variable | Operating Class contains an enumerated value from table E-4 in Annex E of IEEE 802.11-2016 specifying the global operating class |
| | 1 octet | Variable | A single channel number in Operating Class Channel numbering is dependent on Operating Class according to Annex E of IEEE 802.11-2016 |
| | The above 3 fields are repeated (k − 1) (m − 1) times. | | |
| | Both k and m must have the value 1 or higher. | | |

The EMNM Scan Scheduler Policy TLV is described below in Table 26.

TABLE 26

EMNM Scan Scheduler Policy TLV

| Field | Length | Value | Description |
|-------|--------|-------|-------------|
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor OUI |
| | 1 octet | 0x09 | EMNM Scan Scheduler Policy TLV |
| | bit 7 | 0: disable 1: enable | Status of the radio monitor |
| | bits 6-0 | Reserved | |
| | 1 octet | Variable | EMNM Scan scheduler: dwell duration 2.4 GHz [ms] |
| | 1 octet | Variable | EMNM Scan scheduler: dwell duration 5 GHz [ms] |
| | 2 octets | Variable | EMNM Scan scheduler: Home Channel Time 2.4 GHz [ms] |
| | 2 octets | Variable | EMNM Scan scheduler: Home Channel Time 5 GHz [ms] |
| | 1 octet | Variable | EMNM Scan scheduler: Dwell Window Duration [s] |
| | 1 octet | Variable | EMNM Scan scheduler: Radio Reporting Period [minute] |

TABLE 26-continued

| | | | EMNM Scan Scheduler Policy TLV | |
|---|---|---|---|

| Field | Length | Value | Description |
|---|---|---|---|
| | 1 octet | Variable | EMNM Scan scheduler: Channel Switch Time 2.4 GHz [ms] |
| | 1 octet | Variable | EMNM Scan scheduler: Channel Switch Time 5 GHz [ms] |
| | 2 octets | Variable | EMNM Scan scheduler: Total Traffic Threshold 2.4 GHz [kbps] |
| | 2 octets | Variable | EMNM Scan scheduler: Total Traffic Threshold 5 GHz [kbps] |
| | 1 octet | 0x01: 20 MHz 0x02: 40 MHz 0x03: 80 MHz 0x04: 160 MHz | EMNM Scan Scheduler: Scan Bandwidth 2.4 GHz Radio |
| | 1 octet | 0x01: 20 MHz 0x02: 40 MHz 0x03: 80 MHz 0x04: 160 MHz | EMNM Scan Scheduler: Scan Bandwidth 2.4 GHz Radio |
| | 1 octet | m (>0) | How many Unassociated target STAs are configured in the monitor? |
| | 6 octets | STA MAC | MAC address of the target STAs for the Unassociated RSSI monitor |
| | 2 octets | Channel | The channel on which the STA should be monitored |
| The above 2 fields are repeated (m − 1) times (if m = 0, these fields are omitted). | | | |

The EMNM Radio Monitor Response TLV is described below in Table 27.

TABLE 26

| | | | EMNM Radio Monitor Response TLV | |
|---|---|---|---|

| Field | Length | Value | Description |
|---|---|---|---|
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor OUI |
| | 1 octet | 0x0A | EMNM Radio Monitor TLV |
| | 1 octet | a (>0) | Number of measurement iterations, 'a' is defined as the Radio reporting period/Dwell window duration as defined in EasyMeshPlus_M9 |
| | 1 octet | k (>0) | Number of radios for which the report is sent |
| | Timestamp Length Octets | Variable | Timestamp The timestamp shall be formatted as a string using the typedef date-and-time string format as defined in section 3 of IEEE 802.11-2016 and shall include time-secfrac and time-offset as defined in section 5.6 of IETF RFC 3339, Date and Time on the Internet: Timestamps. '\d{4}–\d{2}–\d{2}T\d{2}:\d{2}:\d{2}\.\d+Z\|[\+\−]\ d{2}:\d{2})' |
| | 6 octets | Variable | Radio Unique Identifier of a radio of the Multi-AP Agent for which metrics are being reported. |
| | 1 octet | m (>=0) | Number of channels for which the report is sent |
| | 1 octet | Variable | Channel number |
| | 1 octet | Variable | Transmit Time Fraction (IBSS) [%] |
| | 1 octet | Variable | Receive Time Fraction (IBSS) [%] |
| | 1 octet | Variable | Receive Time Fraction (OBSS) [%] |
| | 1 octet | Variable | Receive Time Fraction (INTF) [%] |
| | 1 octet | Variable | Measurement Duration [ms] |
| | 1 octet | Variable | Medium business defined as an unsigned integer value between 0 and 100, reflecting a number in % |
| The above 7 fields are repeated (k − 1) (m − 1) times (if m = 0, or k = 0, these fields are omitted). | | | |

The EMNM Station Priority Policy TLV is described below in Table 28.

TABLE 28

| | | EMNM Station Priority Policy TLV | |
|---|---|---|---|
| Field | Length | Value | Description |
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor OUI |
| | 1 octet | 0x0B | EMNM Station Priority Policy TLV |
| | 1 octet | k (>0) | Number of Stations in the Object. |
| | 6 octets | Any EUI-48 value | Target STA MAC address (single MAC, OUI or WILDCARD) |
| | 1 octet | Variable | STA priority value |
| | The above 2 fields are repeated k − 1 times. | | |

The EMNM Traffic Policy TLV is described below in Table 29.

TABLE 29

| | | EMNM Traffic Policy TLV | |
|---|---|---|---|
| Field | Length | Value | Description |
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor OUI |
| | 1 octet | 0x0C | EMNM Traffic Policy TLV |
| | 1 octet | k | Number of Stations in the Object. |
| | 6 octets | Any EUI-48 value | STA MAC address. |
| | bit 7 | 0: drop all ingress packets 1: forward all ingress packets | Should the Fronthaul AP drop all ingress packets from a STA? |
| | bit 6 | 0: drop all egress packets 1: forward all egress packets | Should the Fronthaul AP and Backhaul AP drop all packet to a STA? |
| | bits 5-0 | reserved | |
| | The above 3 fields are repeated k − 1 times. | | |

The EMNM Error Report TLV is described below in Table 30.

TABLE 30

| | | EMNM Error Report TLV | |
|---|---|---|---|
| Field | Length | Value | Description |
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor OUI |
| | 1 octet | 0x0D | EMNM Error Report TLV |
| | 1 octet | k | Number of errors in the Object. |
| | 2 octets | MID | MID reflecting the MID used for the Multi-AP Policy Config Request message that triggered the error |
| | 4 octets | Variable | Error code as defined in Table 9 |
| | The above 2 fields are repeated k − 1 times. | | |

The EMNM Tunneled TLV is described below in Table 31.

TABLE 31

| | | EMNM Tunneled TLV | |
|---|---|---|---|
| Field | Length | Value | Description |
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor OUI |
| | 1 octet | 0x0E | EMNM Tunneled TLV |
| | Variable | Variable | Tunneled protocol payload |

The EMNM Tunneled Protocol Type TLV is described below in Table 32.

TABLE 32

| | | EMNM Tunneled Protocol Type TLV | |
|---|---|---|---|
| Field | Length | Value | Description |
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor OUI |
| | 1 octet | 0x0F | EMNM Tunneled Protocol Type TLV |
| | 1 octet | Variable | EMNM Tunneled Protocol Type |

The EMNM Frame Relay Policy Protocol Type TLV is described below in Table 33.

TABLE 33

| | | | EM SIM Frame Relay Policy TLV |
|---|---|---|---|
| Field | Length | Value | Description |
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor GUI |
| | 1 octet | 0x10 | EMNM Frame Relay Policy TLV |
| | 1 octet | k (>0) | Number of Frame Relay Policies |
| | 6 octets | Variable | Radio Unique Identifier of a radio of the Multi-AP Agent for which metrics are being reported. |
| | 2 octets | Variable | IEEE 802.11 frame control value |
| | 1 octet | Variable | IEEE 802.11 action frame category |
| | 1 octet | Variable | IEEE 802.11 Public Action Field Value |
| | 3 octets | Variable | Public Action Frame Organization Identifier (OUI) |
| | | | The above 5 fields are repeated k-1 times. |

The EMNM Management Frame IE Policy TLV is described below in Table 34.

TABLE 34

| | | | EM SIM Management Frame IE Policy TLV |
|---|---|---|---|
| Field | Length | Value | Description |
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor GUI |
| | 1 octet | 0x11 | EMNM Management Frame IE Policy TLV |
| | 1 octet | k (>0) | Number of IE element profiles provided |
| | bit 7 | 0: Don't include IE in beacon<br>1: include IE in beacon | |
| | bit 6 | 0: Don't include IE in Assoc/Reassoc response<br>1: Include IE in Assoc/Reassoc response | |
| | bit 5 | 0: Don't included IE in Auth response<br>1: Include IE in Auth response | |
| | bit 4 | 0: Don't include IE in probe response<br>1: Include IE in probe response | |
| | bit 3 | 0: Don't include IE in action frame<br>1: Include IE in action frame | |
| | bit 2 | 0: Don't include IE in probe request<br>1: Include IE in probe request | |
| | bit 1 | 0: Don't include IE in Assoc/Reassoc request<br>1: Include IE in Assoc/Reassoc request | |
| | bit0 | | Reserved |
| | 2 octets | Length IE | The length of the IE content that is provided |
| | Variable | Variable | (Variable) Content of the EMNM vendor-specific IE |
| | | | The above 10 fields are repeated k-1 times. |

The EMNM Destination Info TLV is described below in Table 35.

TABLE 35

EMNM Destination Info TLV

| Field | Length | Value | Description |
|---|---|---|---|
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor GUI |
| | 1 octet | 0x12 | EMNM Destination Info TLV |
| | 6 octets | Any EUI-48 value | Target recipient's MAC address . |

The EMNM Measurement Report Query TLV is described below in Table 36.

TABLE 36

EMNM Measurement Report Query TLV

| Field | Length | Value | Description |
|---|---|---|---|
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor GUI |
| | 1 octet | 0x13 | EMNM Destination Info TLV |
| | 1 octet | Variable | EMNM Measurement Report ID as defined in Table 4 |
| | 6 octets | Any EUI-48 value | Target MAC address. |
| | 2 octets | Channel | Target channel on which the measurement must be executed |

The EMNM Message Type TLV is described below in Table 37.

TABLE 37

EMNM Message Type TLV

| Field | Length | Value | Description |
|---|---|---|---|
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor GUI |
| | 2 octets | 0x0001 | EMNM TLV ID = EMNM Message Type TLV |
| | 2 octets | variable | EMNM Message ID |

The EMNM Feature Profile TLV is described below in Table 38.

TABLE 38

EMNM Feature Profile TLV

| Field | Length | Value | Description |
|---|---|---|---|
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor GUI |
| | 2 octets | 0x0002 | EMNM TLV ID = EMNM Feature Profile TLV |
| | 4 octets | Variable | EMNM Agent version |
| | 2 octets | k (>0) | Number of EMNM features announced |
| | 4 octets | Variable | EMNM feature |
| | | The above field is repeated k-1 times, except when k equals '0'. In this case the last field is omitted | |

The EMNM Device Info TLV is described below in Table 39.

TABLE 39

EMNM Device Info TLV

| Field | Length | Value | Description |
|-------|--------|-------|-------------|
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor OUI |
| | 2 octets | 0x0003 | EMNM TLV ID = EMNM Device Info TLV |
| | 8 octets | Variable | Boot ID |
| | 128 octets | Variable | Client ID received by EMNM once a platform has been certified successfully. The first 64 octets shall be reserved and kept "0". The latter 64 octets represent the client ID assigned by EMNM. |
| | bit 7 | 1 = Gateway | Gateway product class |
| | bit 6 | 1 = Extender | Extender product class |
| | bit 5 | 1 = STB | STB product class |
| | bits 0-4 | 0 | Reserved |
| | bit 7 | 1 = Controller | Device Role indication |
| | | 0 = Agent | Reserved |
| | bits 0-6 | 0 | |

The EMNM Device Metrics TLV is described below in Table 40.

TABLE 40

EMNM Device Metrics TLV

| Field | Length | Value | Description |
|-------|--------|-------|-------------|
| tlvType | 1 octet | 0x11 | Vendor specific TLV |
| tlvLength | 2 octets | Variable | Number of octets in ensuing tlvValue field. |
| tlvValue | 3 octets | 8841fc | Vendor GUI |
| | 2 octets | 0x0004 | EMNM TLV ID = EMNM Device Metrics TLV |
| | 4 octets | Variable | Uptime in seconds since boot |
| | 1 octet | 0-100 101-255: reserved | CPU load of the platform, reported as an unsigned integer |
| | 1 octet | 0-200 201-255: reserved | CPU temperature, reported as degrees centigrade as unsigned integer values |
| | 4 octets | Variable | Platform used memory, kibibyte count, reported as unsigned integer |
| | 4 octets | Variable | Platform free memory, kibibyte count, reported as unsigned integer |
| | 4 octets | Variable | Platform cached memory, kibibyte count, reported as unsigned integer |
| | 1 octet | k(>=1) | Number of radios in the Access Point device. |
| | 6 octets | Variable | Radio Unique Identifier of a radio |
| | 1 octet | 0-200 201-255: reserved | Radio temperature, reported as degrees centigrade as unsigned integer values |
| | | | The above 2 fields are repeated k-1 times. |

The EMNM Reboot Request TLV is described below in Table 41.

TABLE 41

EMNM Reboot Request TLV

| Field | Length | Value | Description |
|-------|--------|-------|-------------|
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor GUI |
| | 2 octets | 0x0005 | EMNM TLV ID = EMNM Reboot Request TLV |
| | 1 octet | 0x00 = reboot 0x01 = reset + reboot | Action value for the reboot request |

TABLE 41-continued

| Field | Length | Value | Description |
|-------|--------|-------|-------------|
| | | EMNM Reboot Request TLV | |
| | 1 octet | 0x02 – 0xFF = reserved<br>0x00 = reset<br>0x01 = factory reset<br>0x02 – 0xFF = reserved | Reset type definition |

The EMNM Download SW image TLV is described below in Table 42.

TABLE 42

| Field | Length | Value | Description |
|-------|--------|-------|-------------|
| | | EMNM Download SW image TLV | |
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor GUI |
| | 2 octets | 0x0006 | EMNM TLV ID = EMNM Download SW image TLV |
| | 2 octets | variable | SW image download timeout, expressed in seconds |
| | 2 octets | lu: length of the download URL (<1000 CHAR) | Indication of the length of the URL provided in BYTES. The maximum byte value of 1000 Bytes corresponds with a 500 byte 2-byte ASCII character limit. |
| | lu length | variable | Download URL where to get the software image |

The EMNM Download Status TLV is described below in Table 43.

TABLE 43

| Field | Length | Value | Description |
|-------|--------|-------|-------------|
| | | EMNM Download Status TLV | |
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor GUI |
| | 2 octets | 0x0007 | EMNM TLV ID = EMNM Download Status TLV |
| | 1 octet | 0x0: success<br>0x1: failure | Download status at either download timeout or if a download finishes earlier than the timeout value |
| | 64 octets | variable | MD5 sum of the downloaded software image |
| | 1 octet | 0x00: no error<br>0x01: failure | Software image signature verification status |

50

The EMNM Write SW image TLV is described below in Table 44.

TABLE 44

| Field | Length | Value | Description |
|-------|--------|-------|-------------|
| | | EMNM Write SW image TLV | |
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor GUI |
| | 2 octets | 0x0008 | EMNM TLV ID = EMNM Write SW image TLV |
| | 2 octets | variable | SW image write timeout, expressed in seconds |

The EMNM Write Status TLV is described below in Table 45.

TABLE 45

EMNM Write Status TLV

| Field | Length | Value | Description |
|---|---|---|---|
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor GUI |
| | 2 octets | 0x0009 | EMNM TLV ID = EMNM Write Status TLV |
| | 1 octet | 0x0: success | Write status at either write timeout or if a write |
| | | 0x1: failure | finishes earlier than the timeout value |

The EMNM Ethernet Host Stats TLV is described below in Table 46.

TABLE 46

EMNM Ethernet Host Stats TLV

| Field | Length | Value | Description |
|---|---|---|---|
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor GUI |
| | 2 octets | 0x000A | EMNM TLV ID = EMNM Ethernet Stats TLV |
| | 1 octet | k(>0) | Number of Ethernet PHYs/MACs |
| | 6 octets | Any EUI-48 value | Ethernet port's EUI-48 MAC address |
| | 1 octet | h(>0) | Number of logical bridge ports in the Object |
| | 1 octet | le | Length of the logical ethernet (bridge port) interface name (string less than 64 octets) |
| | le octets (<64 octets) | logical bridge port name | A string representing the unique interface string Ethernet port (e.g. eth0) |
| | 1 octet | Variable | Link type (0 = undefined, 1 = 10 Mbps, 2 = 100 Mbps, 3 =1 Gbps, 4 = 2,5 Gbps, 5 = 5 Gpbs, 6 = 10 Gbps) |
| | 4 octets | Variable | unicast kibibytes sent |
| | 4 octets | Variable | multicast kibibytes sent |
| | 4 octets | Variable | broadcast kibibytes sent |
| | 4 octets | Variable | unicast kibibytes received |
| | 4 octets | Variable | multicast kibibytes received |
| | 4 octets | Variable | broadcast kibibytes received |
| | 4 octets | Variable | unicast Packets Sent |
| | 4 octets | Variable | multicast Packets Sent |
| | 4 octets | Variable | broadcast Packets Sent |
| | 4 octets | Variable | unicast Packets received |
| | 4 octets | Variable | multicast Packets received |
| | 4 octets | Variable | broadcast Packets received |
| | | | The above 15 fields are repeated (h-1)(k-1) times. |

The EMNM Debug Info Trigger TLV is described below in Table 47.

TABLE 47

EMNM Debug Info Trigger TLV

| Field | Length | Value | Description |
|---|---|---|---|
| tlvType | 1 octet | 0x11 | Vendor specific TLV |
| tlvLength | 2 octets | Variable | Number of octets in ensuing tlvValue field |
| tlvValue | 3 octets | 0x8841fc | Vendor GUI |
| | 2 octets | 0x000B | EMNM TLV ID = EMNM Debug Info Trigger TLV |
| | bit 7 | 1: enable | Enable or disable uploading extender event |
| | | 0: disable | information to a preconfigured logging mechanism. |
| | bit 0-6 | 0 | reserved |
| | 1 octet | 0-10: log level | Unsigned integer representation of the log level. |
| | | 11-255: reserved | |

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for use in a wireless network device, the method comprising:

operating an enhanced mesh network management (EMNM) agent at the wireless network device;

receiving, by the EMNM agent from an associated mesh access point (AP), an EMNM feature profile type length value (TLV) indicating an EMNM agent release version indicator and a supported feature set associated with the associated mesh AP;

responsive to determining, based on the EMNM feature profile TLV, that the associated mesh AP supports an EMNM device metrics reporting feature, enabling device metrics reporting for the associated mesh AP;

receiving, by the EMNM agent from the associated mesh AP, a WiFi EasyMesh compatible message;

determining, by the EMNM agent, that the WiFi EasyMesh compatible message includes an EMNM formatted information element including device metrics of the associated mesh AP;

on a condition that the EMNM agent determines that the WiFi EasyMesh compatible message includes the ENMN formatted information element, storing the device metrics of the associated mesh AP.

2. The method of claim 1, wherein the determining, by the EMNM agent, that the WiFi EasyMesh compatible message includes an EMNM formatted information element including device metrics of the at least one associated mesh AP is based on a type value included in the EMNM formatted information element.

3. The method of claim 1, further comprising:

operating an EMNM controller at the wireless network device;

generating, by the EMNM controller, a WiFi EasyMesh message requesting device metric information from the associated mesh AP.

4. The method of claim 1, wherein the device metrics include at least one of a CPU load of the at least one mesh AP, a memory load of the at least one mesh AP, or a temperature of a processor of the associated mesh AP.

5. The method of claim 1, further comprising:

operating an EMNM controller at the wireless network device;

transmitting, by the EMNM controller, at least one of the device metrics of the associated mesh AP to a cloud server via the Internet;

receiving, by the EMNM controller, an action to perform associated with the associated mesh AP, from the cloud server via the Internet, based on the of the device metrics of the associated mesh AP.

6. The method of claim 1, wherein the EMNM formatted information element including device metrics of the associated mesh AP is formatted in a type, length, value format.

7. The method of claim 1, wherein the EMNM formatted information element including device metrics of the associated mesh AP includes one octet indicative of a CPU load coded as an unsigned integer where a value of 0 indicates a 0% CPU load and a value of 255 indicates a 100% CPU load.

8. The method of claim 7, further comprising:

determining the CPU load as the reciprocal of the fraction of idle time, compared to the total CPU time, scaled to percent, for a monitoring time window.

9. The method of claim 1, wherein the EMNM formatted information element including device metrics of the associated mesh AP includes one octet indicative of a temperature coded as an unsigned integer.

10. The method of claim 1, wherein the EMNM formatted information element including device metrics of the associated mesh AP includes eight octets indicative of a free memory coded as an unsigned integer.

11. A wireless network device comprising:

at least one processor configured to run an enhanced mesh network management (EMNM) agent at the wireless network device;

a transceiver configured to receive, from an associated mesh access point (AP), an EMNM feature profile type length value (TLV) indicating an EMNM agent release version indicator and a supported feature set associated with the associated mesh AP;

the at least one processor configured to determine, based on the EMNM feature profile TLV, that the associated mesh AP supports an EMNM device metrics reporting feature, and to enable device metrics reporting for the associated mesh AP responsive to the determination;

the transceiver configured to receive, along with the EMNM agent, from the associated mesh AP, a WiFi EasyMesh compatible message;

the at least one processor configured to determine, by the EMNM agent, that the WiFi EasyMesh compatible message includes an EMNM formatted information element including device metrics of the associated mesh AP;

a memory configured, on a condition that the EMNM agent determines that the WiFi EasyMesh compatible message includes the EMNM formatted information element, to store the device metrics of the associated mesh AP.

12. The wireless network device of claim 11, wherein the processor is configured to determine, by the EMNM agent, that the WiFi EasyMesh compatible message includes an EMNM formatted information element including device metrics of the associated mesh AP based on a type value included in the EMNM formatted information element.

13. The wireless network device of claim 11, wherein the processor is further configured to operate an EMNM controller, and to generate, by the EMNM controller, a WiFi EasyMesh message requesting device metric information from the associated mesh AP.

14. The wireless network device of claim 11, wherein the device metrics include at least one of a CPU load of the at least one mesh AP, a memory load of the at least on mesh AP, or a temperature of a processor of the associated mesh AP.

15. The wireless network device of claim 11, wherein the processor is further configured to operate an EMNM controller, the wireless network device further comprising:

a transmitter configured to transmit, by the EMNM controller, at least one of the device metrics of the associated mesh AP to a cloud server via the Internet; and a receiver configured to receive, by the EMNM controller, an action to perform associated with the associated mesh AP, from the cloud server via the Internet, based on the device metrics of the associated mesh AP.

16. The wireless network device of claim 11, wherein the EMNM formatted information element including device metrics of the associated mesh AP is formatted in a type, length, value format.

17. The wireless network device of claim 11, wherein the EMNM formatted information element including device metrics of the associated mesh AP includes one octet indicative of a CPU load coded as an unsigned integer where a value of 0 indicates a 0% load and a value of 255 indicates a 100% load.

18. The wireless network device of claim 17, wherein the CPU load is determined as the reciprocal of the fraction of idle time, compared to the total CPU time, scaled to percent, for a monitoring time window.

19. The wireless network device of claim 11, wherein the EMNM formatted information element including device metrics of the associated mesh AP includes one octet indicative of a temperature coded as an unsigned integer.

20. The wireless network device of claim 11, wherein the EMNM formatted information element including device metrics of the associated mesh AP includes eight octets indicative of a free memory coded as an unsigned integer.

* * * * *